(12) United States Patent
Miyamoto et al.

(10) Patent No.: US 6,220,962 B1
(45) Date of Patent: Apr. 24, 2001

(54) VIDEO GAME APPARATUS HAVING A DIRECTION POINTING MARK AND PLAYER OBJECT DISPLAYED ON A GAME SCREEN

(75) Inventors: Shigeru Miyamoto; Yoichi Yamada; Toshio Iwawaki; Toru Osawa; Tsuyoshi Kihara, all of Kyoto (JP)

(73) Assignee: Nintendo Co., Ltd, Higashiyama-ku (JP)

( * ) Notice: Subject to any disclaimer, the term of this patent is extended or adjusted under 35 U.S.C. 154(b) by 0 days.

(21) Appl. No.: 09/195,985

(22) Filed: Nov. 19, 1998

(30) Foreign Application Priority Data

Nov. 20, 1997 (JP) .................................................. 9-319667

(51) Int. Cl.$^7$ ...................................................... A63F 9/24
(52) U.S. Cl. ............................................... 463/32; 273/388
(58) Field of Search .................................. 463/2, 3, 4, 5, 463/7, 9, 30, 31, 32, 38; 273/317.1, 388

(56) References Cited

U.S. PATENT DOCUMENTS

| | | | |
|---|---|---|---|
| 5,679,075 | * 10/1997 | Forrest et al. | 463/9 |
| 5,903,257 | * 5/1999 | Nishiumi et al. | 463/38 |
| 5,947,819 | * 9/1999 | Ohshima | 463/2 |
| 6,045,446 | * 4/2000 | Ohshima | 463/2 |

\* cited by examiner

*Primary Examiner*—Peter Vo
*Assistant Examiner*—John Paradiso
(74) *Attorney, Agent, or Firm*—Nixon & Vanderhye P.C.

(57) ABSTRACT

A video game apparatus includes a CPU. The CPU determines straight lines respectively connecting between the player object and a North Pole, target and marker, and determines respective directions of a direction pointing mark, target pointing mark and marker pointing mark to point in directions parallel to the straight lines. The player object or other objects are combined with these pointing marks, and displayed on a display.

24 Claims, 21 Drawing Sheets

VIDEO GAME APPARATUS HAVING A DIRECTION POINTING MARK AND PLAYER OBJECT DISPLAYED ON A GAME SCREEN

BACKGROUND OF THE INVENTION

1. Field of the Invention

This invention relates to a three dimensional display video game apparatus and memory medium used therefor. More particularly, the invention relates to a novel video game apparatus which is adapted to show on the game screen a direction in which the player object is to move, a particular azimuth and the like, and a memory medium used therefor.

2. Description of the Prior Art

In conventional role playing or action games, a two dimensional size-reduction map is displayed at a corner on the screen reducing the size of a two dimensional scene as viewed from the above of a map for the game, thereby displaying a position of a player object using points or symbols on the map. Also, some games are adapted to display a destination that a player object is to advance using a symbol on a size-reduction map.

In the conventional technique of displaying symbols or marks on a size-reduction map, it is necessary to create a size-reduction map in relation to the creation of image or polygon data or background map scenes for the game. Due to this necessity, the background map scene, if changed, causes the size-reduction map to change in a corresponding manner, thereby complicating programming of the game.

With the conventional size-reduction map display technique, the player has to look at both a player object and a size-reduction map simultaneously or sequentially while playing the game. There has been a disadvantage that the player is forced to frequently move his/her line of sight, leading to fatigue in his/her eyes.

Furthermore, if a size-reduction map is applied to a currently popular game utilizing three dimensional image representation, the size-reduction map is displayed in a two dimensional form, despite the player object or its background scene, etc. being displayed in three dimensions. Accordingly, the player has to consider the relationship between a direction or movement of a player object existing in the three dimensional space and its position being displayed on the size-reduction map. This may cause confusion in game manipulation or an erroneous determination about a position of the player object in the three dimensional scene. Thus there has been difficulty in operating a three dimensional image displaying video game.

SUMMARY OF THE INVENTION

Therefore, it is an object of the present invention to provide a three dimensional display video game apparatus which can make it easy to recognize a current position of a player object in a three-dimensional space.

It is another object of the present invention to provide a three dimensional display video game apparatus with which a player can readily know a position and direction in which the player object is to move without reference to a map.

It is still another object of the present invention to provide a three dimensional display video game apparatus which can make it easy to show a direction in which the player object is to move without displaying a map, and to develop a game program therefor.

It is another object of the present invention to provide a three dimensional display video game apparatus which can show a destination where the player object is to advance without reference to a map, so that game progression is assisted so that enjoyment of the game by the player can be enhanced.

A three dimensional display video game apparatus according to the present invention has, in association therewith, an operating means including a direction instructing means to instruct a direction in movement of a player object. When the player object is placed within a virtual three dimensional space, image data for displaying the player object as viewed from a certain point of sight is generated and supplied to a display unit to thereby provide such a game scene that the player object can be moved to a predetermined region on a screen of the display in accordance with an indication of the direction instructing means. A direction pointing mark having a pointing direction variable depending upon a position of the player object is displayed at a location close to the player object on the game screen.

More specifically, a three dimensional display video game apparatus has, in association therewith, an operating means including a direction instructing means to instruct a direction in movement of the player object. When the player object is placed within a virtual three dimensional space, image data for displaying the player object as viewed from a certain point of sight is generated and supplied to a display unit. The video game apparatus comprises an image data generating means for generating image data to display the player object and a direction pointing mark; a player object coordinate data generating means for generating player object coordinate data representative of a current position of the player object in the virtual three dimensional space based upon an operating state of the direction instructing means; a pointed-subject data generating means for generating data of a pointed-subject to be pointed by the direction pointing mark; a pointing direction determining means for determining a pointing direction of the direction pointing mark in the virtual three dimensional space based on the pointed-subject data and the player object coordinate data; a direction pointing mark data generating means for generating a direction pointing mark data to display the direction pointing mark at a location close to the player object and in a direction determined by the direction determining means; and a display data generating means for generating display data according to the image data, the player object coordinate data and the direction pointing mark data, in order to combine the player object with the direction pointing mark to display a two-dimensional combined image on the display unit.

A memory medium used in such a three dimensional display video game apparatus comprises: an image data generating area for generating image data to display the player object and a direction pointing mark; a player object coordinate data generating program for generating player object coordinate data representative of a current position of the player object in the virtual three dimensional space based upon an operating state of the direction instructing means; a pointed-subject data generating program for generating data of a pointed-subject to be pointed by the direction pointing mark; a pointing direction determining program for determining a pointing direction of the direction pointing mark in the virtual three dimensional space based on the pointed-subject data and the player object coordinate data; a direction pointing mark data generating program for generating a direction pointing mark data to display the direction pointing mark at a location close to the player object and in a direction determined by the direction determining program;

and a display data generating program for generating display data according to the image data, the player object coordinate data and the direction pointing mark data, in order to combine the player object with the direction pointing mark to display a two-dimensional combined image on the display unit.

The pointing direction determining means determines a direction of the direction pointing mark based on the player object coordinate data from the player object coordinate data generating means and the pointed-subject data for the pointed subject (e.g., destination, article, path marker, azimuth or the like) from the pointed-subject data generating means. For example, a straight line is determined that connects between the player object and the target (destination or article), and a pointing direction is determined such that it is in parallel with the straight line. The direction pointing mark data generating means generates, for example, two-point coordinate data of the direction pointing mark so as to direct the direction pointing mark to that pointing direction.

The display data generating means combines the player object and other objects with the direction pointing mark and generates display data to display two dimensional combined image on the display unit, based on the player object coordinate data and the direction pointing mark data. Accordingly, a direction pointing mark is two-dimensionally displayed together with the player object or other objects in a game scene on the display screen.

According to the present invention, it is possible to readily know a position or direction in a three dimensional space where the player object is to advance. Due to this, the player object is easy to move and operate therefor.

Furthermore, according to the present invention, because the direction pointing mark indicative of an advancing direction or azimuth is displayed at a location close to the player object, the player is required merely to operate the direction instructing means, e.g., analog joystick, in a manner advancing the player object in a pointed direction, thus promoting game progression. As a result, a relatively difficult game can be made clear. It is thus possible for most players to achieve enjoyment and satisfaction through the game.

The above described objects and other objects, features, aspects and advantages of the present invention will become more apparent from the following detailed description of the present invention when taken in conjunction with the accompanying drawings.

DETAILED DESCRIPTION OF ONE PREFERRED EMBODIMENT

Figure 1:
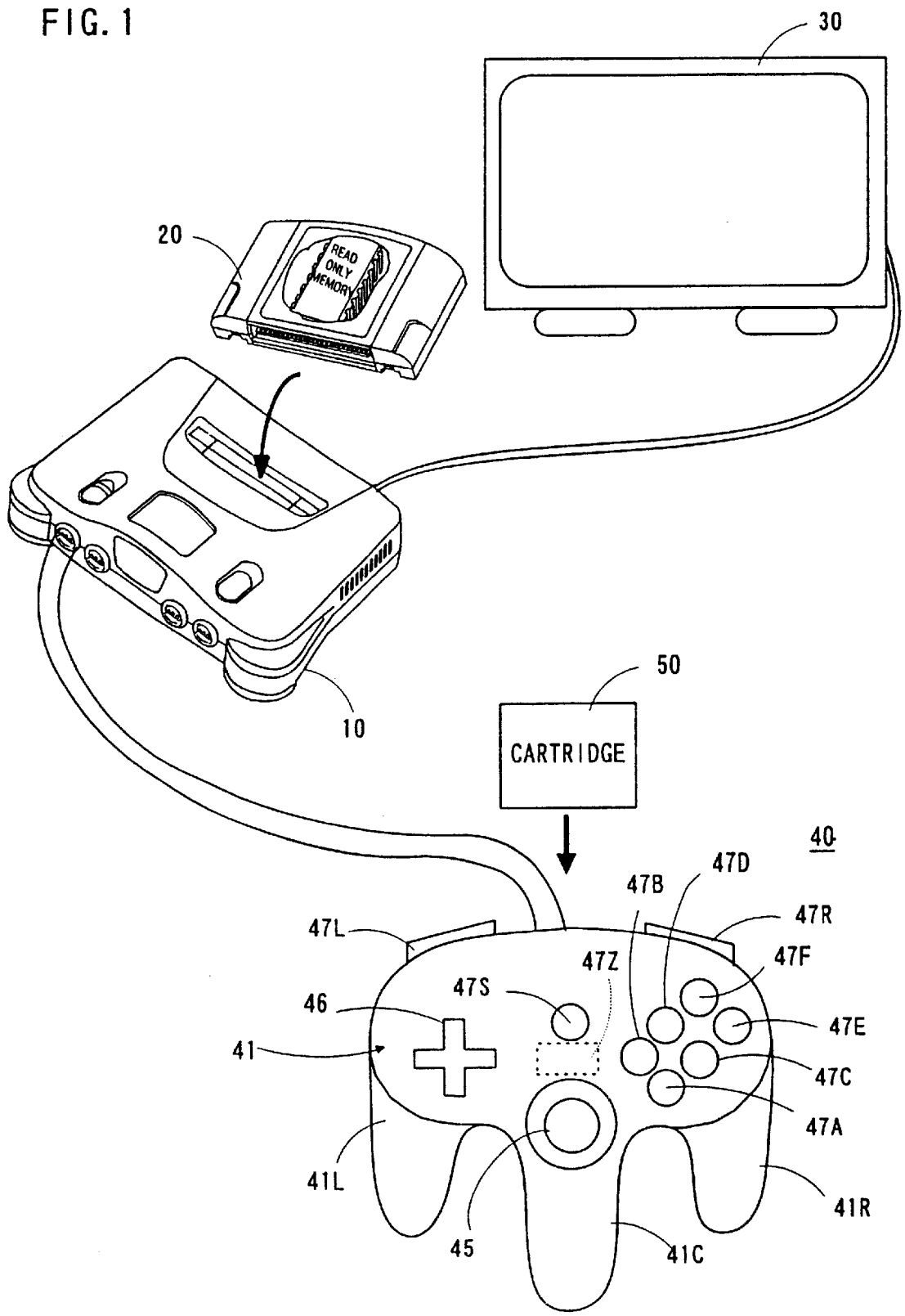
FIG. 1 is a schematic illustrative view showing a video game system according to one embodiment of the present invention.

Referring to FIG. 1, a video game system in this embodiment includes a video game machine 10, a ROM cartridge 20 as one example of a memory medium, a display unit 30 connected to the video game machine 10, and a controller 40. The controller 40 is dismountably mounted with a cartridge 50.

The controller 40 is structured by a plurality of switches or buttons provided on the housing 41 in a form graspable by one or two hands of the player. Specifically, the controller 40 includes handles 41L, 41C, 41R downwardly extending respectively from a left end, a right end and a center of the housing 41, providing an operation area on a top surface of the housing 41. The operation area of the housing 41 includes an analog-inputtable joystick (hereinafter referred to as "analog joystick") 45 at a central lower portion thereof, a cross-shaped digital direction switch (hereinafter called "cross switch") 46 on the left side, and a plurality of button switches 47A, 47B, 47D, 47E and 47F on the right side.

The analog joystick 45 is used to input moving directions, moving speeds and/or amounts of movement of the player object as determined by an amount and direction of joystick inclination. The cross switch 46 is used to designate a moving direction of the player object in place of the joystick 45. The button switches 47A and 47B are used to designate a motion of the player object. Button switches 47C–47D are used to switch over a sight point for a three-dimension image camera or to adjust the speed or the like of the player object.

A start switch 47S is provided the center of the operation area. The start switch 47S is operated when starting a game. A switch 47Z is provided at a backside of the central handle 41C. This switch 47Z is utilized, for example, as a trigger switch in a shoot game. This switch (hereinafter called the "Z button") 47Z is operated when the player object is to be caused to pay attention to a non-player object. That is, the switch 47Z functions as a second operating means. Switches 47L and 47R are provided at the upper left and right portion of a lateral surface of the housing 41.

Incidentally, the above-stated button switches 47C–47F can also be used to control the moving speed (e.g. acceleration or deceleration) of the player object in a shoot or action game, in addition to the purpose of switching the camera visual point. However, these switches 47A–47F, 47S, 47Z, 47L and 47R can be arbitrarily defined in their function depending upon a game program.

Figure 2:
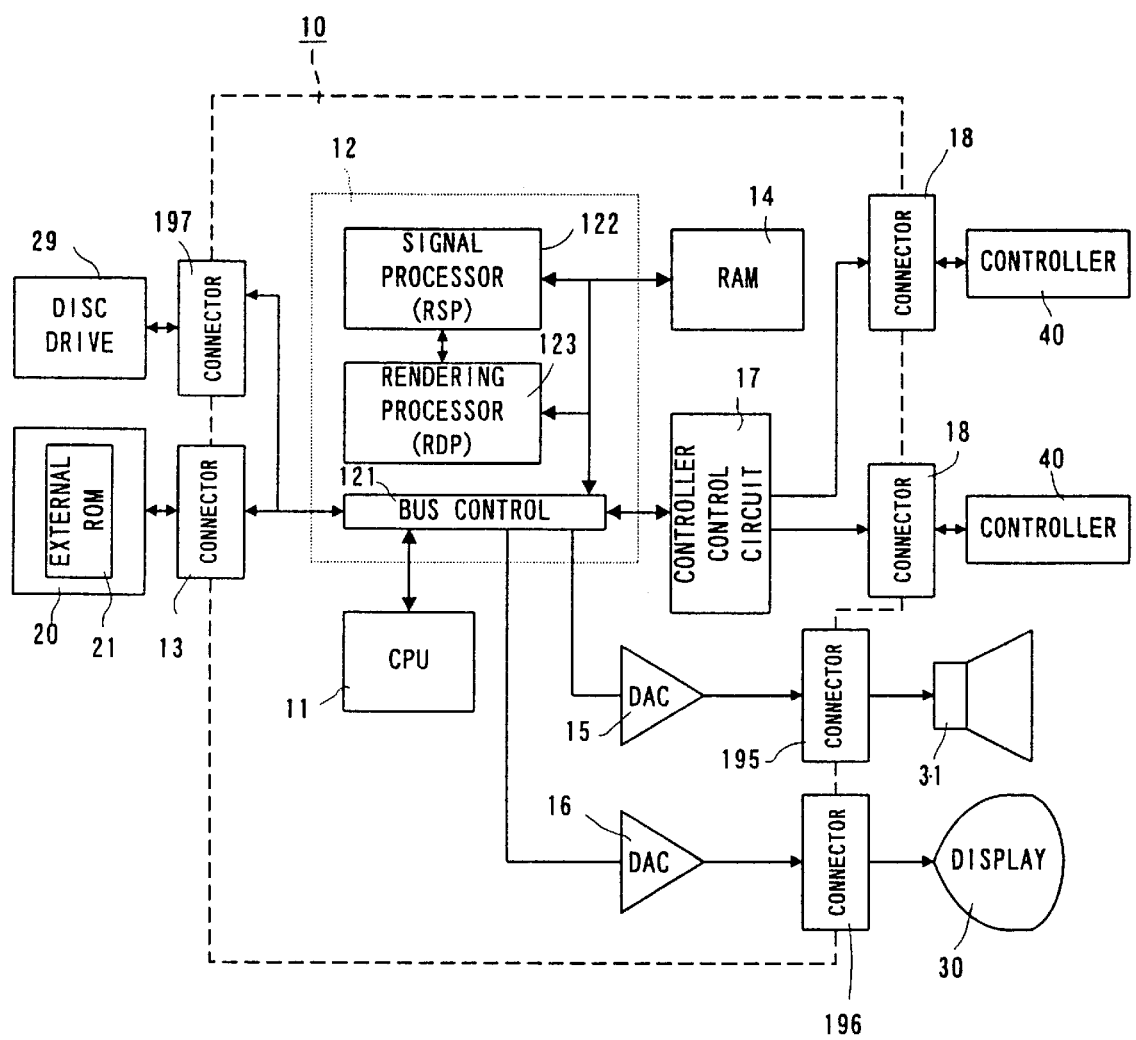
FIG. 2 is a block diagram showing in detail a video game machine in FIG. 1.

FIG. 2 is a block diagram of the video game system of the embodiment disclosed in FIG. 1. The video game machine 10 incorporates therein a central processing unit (hereinafter referred to as "CPU") 11 and a coprocessor (reality coprocessor: hereinafter referred to as "RCP") 12. The RCP 12 includes a bus control circuit 121 for controlling buses, a signal processor (reality signal processor; hereinafter referred to as "RSP") 122 for performing polygon coordinate transformation, shading treatment and so on, and a rendering processor (reality display processor; hereinafter referred to as "RDP") 46 for rasterizing polygon data into an image to be displayed and converting the same into a data form (dot data) memorable on a frame memory.

The RCP 12 is connected with a cartridge connector 13 for unloading and loading a ROM cartridge 20 having an external ROM 21 incorporated therein, a disc-drive connector 197 for detachably mounting a disc drive 29, and a RAM 14. Also, the RCP 12 is connected with DAC (Digital/Analog Converters) 15 and 16 for respectively outputting a sound signal and video signal to be processed by the CPU 11. Further, the RCP 12 is connected with a controller control circuit 17 to serially transfer operating data on one or a plurality of controllers 40 and/or data of the cartridge 50.

The bus control circuit 121 included in the RCP 12 performs parallel/serial conversion on a command supplied in a parallel signal from the CPU via a bus, to thereby supply a serial signal to the controller control circuit 17. Also, the bus control circuit 121 converts a serial signal inputted from the controller control circuit 17 into a parallel signal, giving an output to the CPU 11 via the bus. The data representative of an operating state (operating signal or operating data) read out of the controller 40A–40D is processed by the CPU 11, and temporarily stored within a RAM 14 etc. In other words, the RAM 14 includes a storage site for temporarily memorizing the data to be processed by the CPU 11, so that it is utilized for smoothly reading and writing data through the bus control circuit 121.

The sound DAC 15 is connected with a connector 195 provided at a rear face of the video game machine 10. The image DAC 16 is connected with a connector 196 provided at the rear face of the video game machine 10. The connector 195 is connected with a speaker 31 of a display 30, while the connector 196 is connected with a display 30 such as a TV receiver or CRT.

The controller control circuit 17 is connected with a controller connector provided at the front face of the video game machine 10. The connector 18 is removably connected by a controller 40 through a connecting jack. The connection of the controller 40 to the connector 18 places the controller in electrical connection to the video game machine 10, thereby enabling transmission/reception or transfer of data therebetween.

Figure 3:
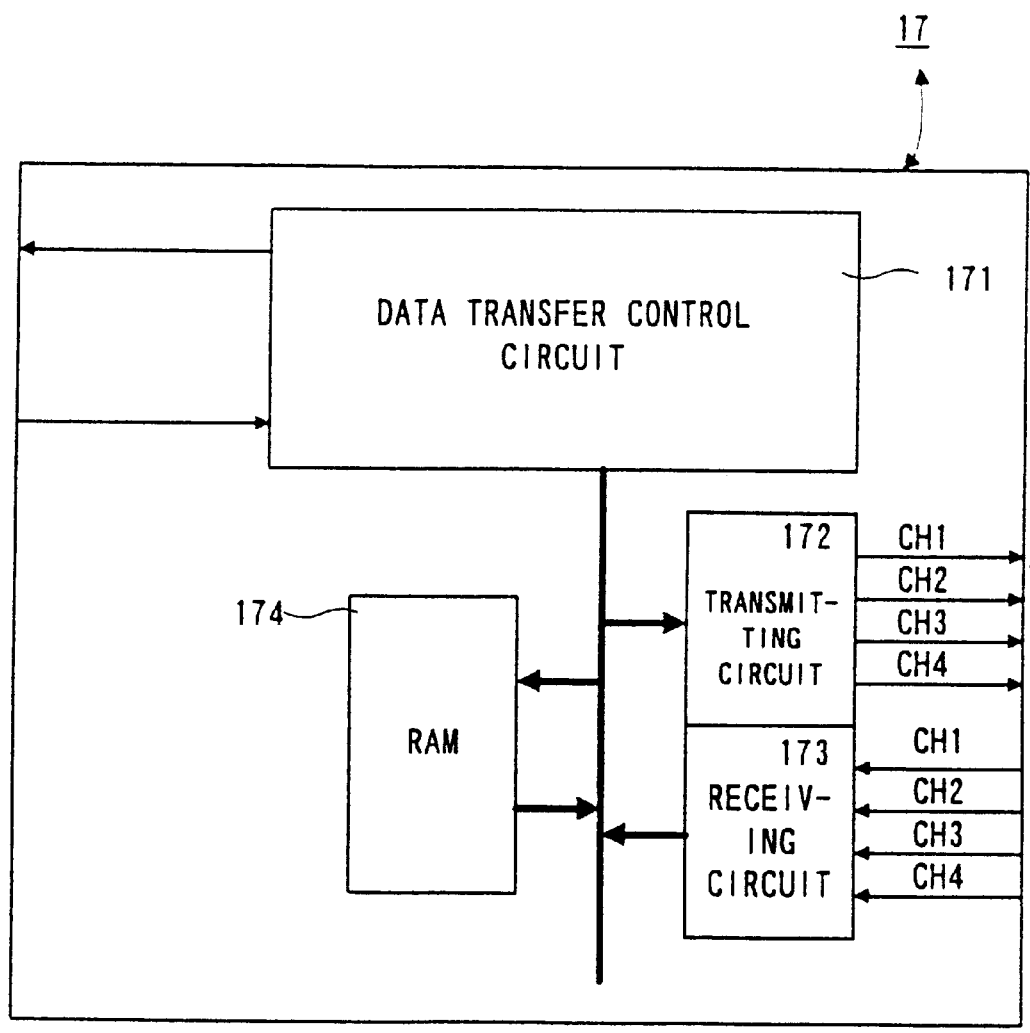
FIG. 3 is a block diagram showing with greater detail a controller control circuit in FIG. 2.

The controller control circuit 17 is used to transmit and receive data in serial between the RCP 12 and the connector 18. The controller control circuit 17 includes, as shown in FIG. 3, a data transfer control circuit 171, a transmitting circuit 172, a receiving circuit 173 and a RAM 174 for temporarily memorizing transmission and reception data. The data transfer control circuit 171 includes a parallel/serial converting circuit and a serial/parallel converting circuit in order to convert the data format during data transfer, and further performs write/read control on the RAM 174. The serial/parallel converting circuit converts the serial data supplied from the RCP 12 into parallel data, supplying it to the RAM 174 or the transmitting circuit 172. The parallel/serial converting circuit converts the parallel data supplied from the RAM 174 or the receiving circuit 173 into serial data, to supply it to the RCP 12. The transmitting circuit 172 converts the command for reading signals from the controller 40 and the writing data (parallel data) to the cartridge 50, into serial data to be delivered to channels CH1–CH4 corresponding to the respective controllers 40. The receiving circuit 173 receives, in serial data, the operational state data of the controllers inputted through corresponding channels CH1–CH4 and data read from the cartridge 50, to convert them into parallel data to be delivered to the data transfer control circuit 171. The data transfer control circuit 171 writes into the RAM 174 data transferred from the RCP 12, data of the controller received by the receiving circuit 183, or data read out of the RAM cartridge 50, and reads data out of the RAM 174 based on a command from the RCP 12 so as to transfer it to the RCP 12.

The RAM 174, includes memory sites (not shown) for the respective channels CH1–CH4. Each of the memory sites is stored with a command for the channel, transmitting data and/or reception data.

Figure 4:
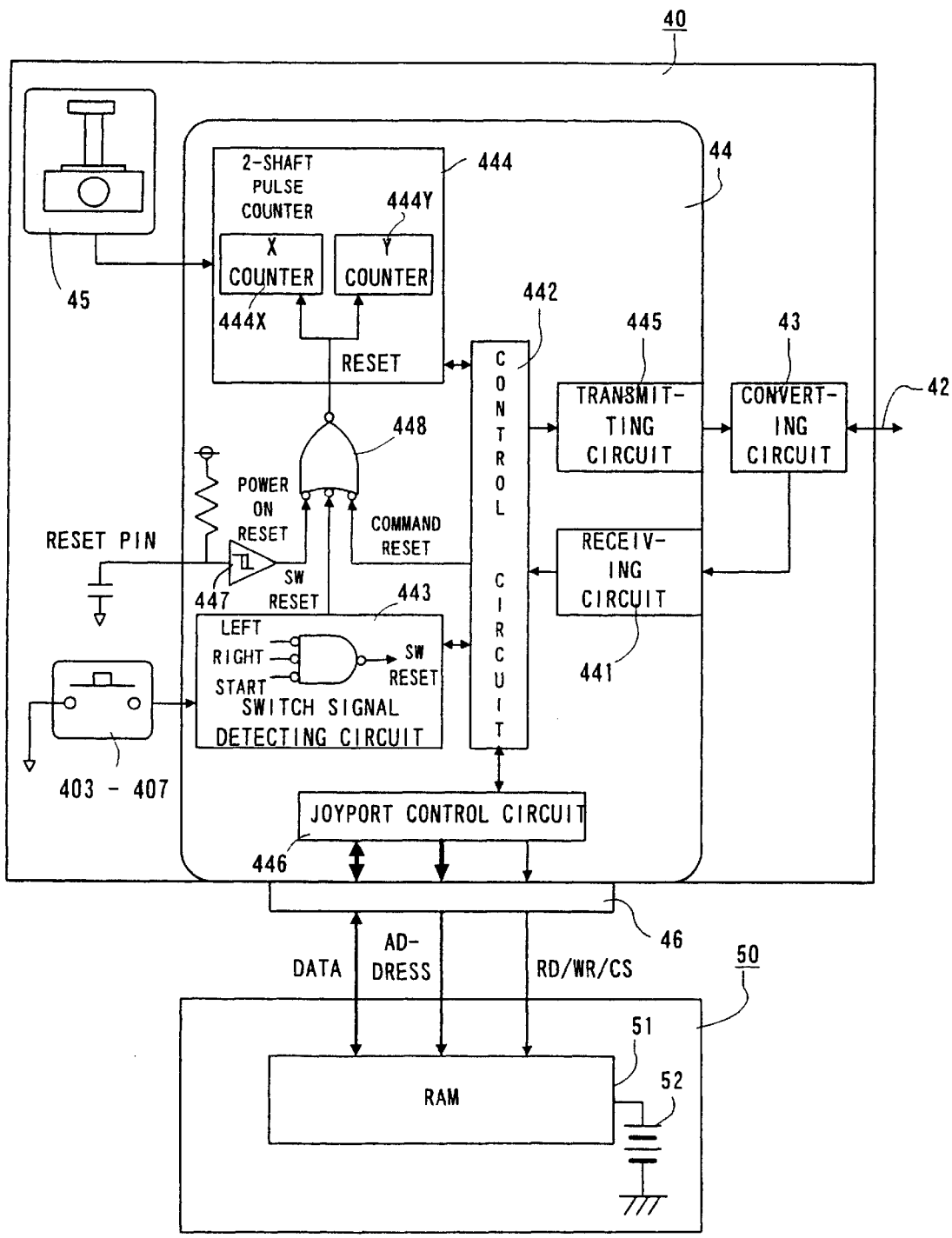
FIG. 4 is a block diagram showing in detail a controller and cartridge in FIG. 1.

FIG. 4 is a detailed circuit diagram of the controller 40 and the cartridge 50. The housing of the controller 40 incorporates an operating signal processing circuit 44, etc. in order to detect an operating state of the joystick 45, switches 46, 47, etc. and transfers the detected data to the controller control circuit 17. The operating signal processing circuit 44 includes a receiving circuit 441, a control circuit 442, a switch signal detecting circuit 443, a counter circuit 444, a joyport control circuit 446, a reset circuit 447 and a NOR gate 448. The receiving circuit 441 converts a serial signal, such as a control signal transmitted from the controller control circuit 17 or writing data to the cartridge 50, into a parallel signal to supply it to the control circuit 442. The control circuit 442 generates a reset signal to reset (0), through the NOR gate 448, count values of an X-axis counter 444X and a Y-axis counter 444Y within the counter 444, when the control signal transmitted from the controller control circuit 17 is a signal for resetting X, Y coordinates of the joystick 45.

The joystick 45 includes X-axis and Y-axis photo-interrupters in order to decompose a lever inclination into X-axis and Y-axis components, generating pulses in number proportional to the inclination. The pulse signals are respectively supplied to the counter 444X and the counter 444Y. The counter 444X counts a number of pulses generated in response to an inclination amount when the joystick 45 is inclined in the X-axis direction. The counter 444Y counts a number of pulses generated responsive to an inclination amount when the joystick 45 is inclined in the Y-axis direction. Accordingly, the resultant X-axis and Y-axis vector determined by the count values of the counters 444X and 444Y serves to determine a moving direction and a coordinate position of the player object or hero character or a cursor. Incidentally, the counter 444X and the 444Y are reset, when a reset signal is supplied from the reset signal generating circuit 447 upon turning on the power or when a reset signal is supplied from the switch signal detecting circuit 443 by simultaneous depression of predetermined two switches.

The switch signal detecting circuit 443 responds to a switch-state output command supplied at an interval of a constant period (e.g. a 1/30 second interval as a TV frame period) from the control circuit 442, to read a signal varying depending upon a depression state of the cross switch 46 and the switches 47A–47Z. The read signal is delivered to the control circuit 442. The control circuit 442 responds to a read-out command signal of operational state data from the controller control circuit 17 to supply in a predetermined data format the operational state data on the switches 47A–47Z and count values of the counters 444X and 444Y to the transmitting circuit 445. The transmitting circuit 445 converts the parallel signal outputted from the control circuit 442 into a serial signal, and transfers it to the controller control circuit 17 via a converting circuit 43 and a signal line 42. The control circuit 442 is connected with a joyport control circuit 446 via an address bus and a data bus as well as a port connector 46. The joyport control circuit 446 performs data input/output (or transmission/reception) control according to a command from the CPU 11 when the cartridge 50 is connected to the port connector 46.

The cartridge 50 is formed by connecting the RAM 51 to the address bus and data bus and connecting the RAM 51 with a battery 52. The RAM 51 is a RAM having a capacity (e.g. 256 k bits), for example, of lower than a half of a maximum memory capacity accessible through the address bus. The RAM 51 is to store backup data in relation to a game, and saves backup data by the application of electric power from the battery 52 even if the cartridge 50 is withdrawn from the port connector 46.

Figure 5:
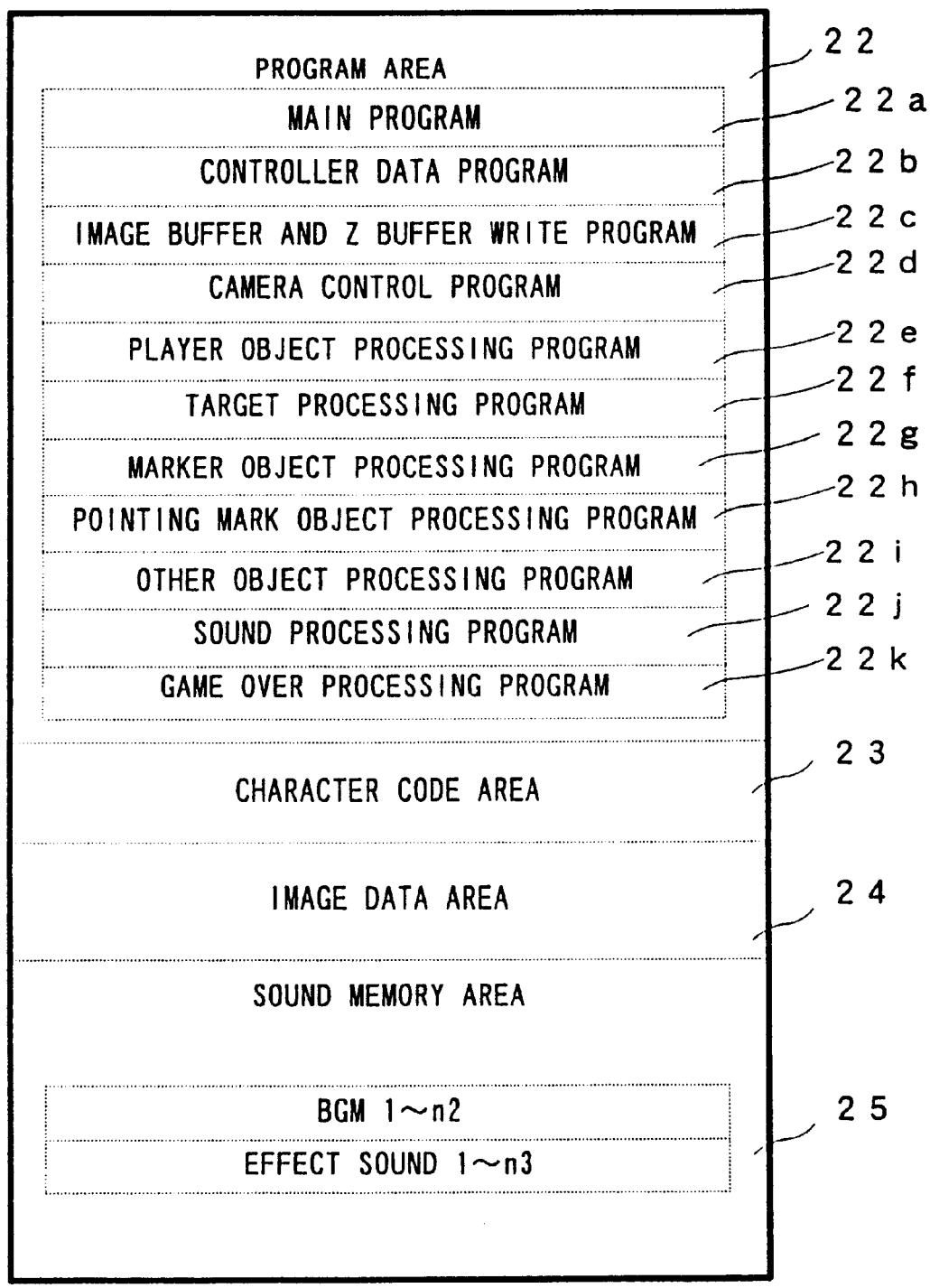
FIG. 5 is an illustrative view showing a memory map of an external ROM in FIG. 2.

FIG. 5 is a memory map showing a memory space of the external ROM 21 incorporated in the ROM cartridge 20 (FIG. 1). The external ROM 21 includes a plurality of memory areas (hereinafter referred to merely as "area"), for example, such as a program area 22, a character code area 23, an image data area 24 and a sound memory area 25, as shown in FIG. 5, thereby previously storing various programs in a fixed manner.

The program area 22 is stored with programs required to process game images, game data and the like in accordance with the game content. Specifically, the program area 22 includes a plurality of memory areas to previously store operating programs for the CPU 11 in a fixed manner. A main program area 22a is stored with a main routine processing program, for example, for a game shown in FIG. 8 below. A controller data program area 22b is stored with a program for processing operational data on the controller 40. A write program area 22c is stored with a write program by which the CPU 11 causes the RCP 12 to write into a frame memory and Z buffer. For example, the write program area 22c is stored with a program to write, into an image data area 203 (FIG. 6, FIG. 7) of the RAM 14, color data as image data based on texture data for a plurality of movable objects or background objects to be displayed in one background scene. A camera control program area 22d is stored with a camera control program that controls which direction and/or position the movable objects including the player object or the background objects are to be photographed in the three-dimension space. A player object program area 22e is stored with a program that controls the display an object operated by the player (player object). A target processing program area 22f is stored with a program to process or display a destination to which the player object is required to advance or an article (important item) that the player object has to acquire during the course of a game (they may be hereinafter referred to as "target"). A marker object processing program area 22g is stored with a program to display a marker object according to marker object data for pointing a marker set on a path that the player object has passed or at a site important for the player object. A pointing mark object processing program area 22h is stored with a program to display in a predetermined state a direction pointing mark object for pointing an azimuth or direction in which the player object is required to move. The program area further provided with an other-object processing program area 22i, sound processing program area 22j and game-over processing program area 22k.

The character code area 23 is an area to store a plurality of kinds of character codes, e.g. a plurality of kinds of character dot data corresponding to the codes. The character code data memorized in the character code area 23 is utilized to display an instruction sentence to the player in the process of a game.

An image data area 24 is stored with image data, such as coordinate data of a plurality of polygons for each of the background object and/or movable objects, and texture data, and also a display control program to display these objects stationary at a predetermined position or in a moving state.

A sound memory area 25 is stored with sound data, such as phrases for outputting in sound the above message, sounds effects, game music (BGM), etc., in a manner appropriate for a scene.

Incidentally, the memory medium or external memory device may use various kinds of memory mediums, such as CD-ROMs or magnetic discs, in place of or in addition to the ROM cartridge 20. In such a case, a disc drive 29 (FIG. 2) is provided in order to read or write, if required, various data (including program data and data for image presentation) for a game from or onto an optical or magnetic disc memory medium such as a CD-ROM or magnetic disc. The drive 29 magnetically or optically reads data out of a magnetic disc or optical disc stored program data similar to the external ROM 21, and transfers data to the RAM 14.

Figure 6:
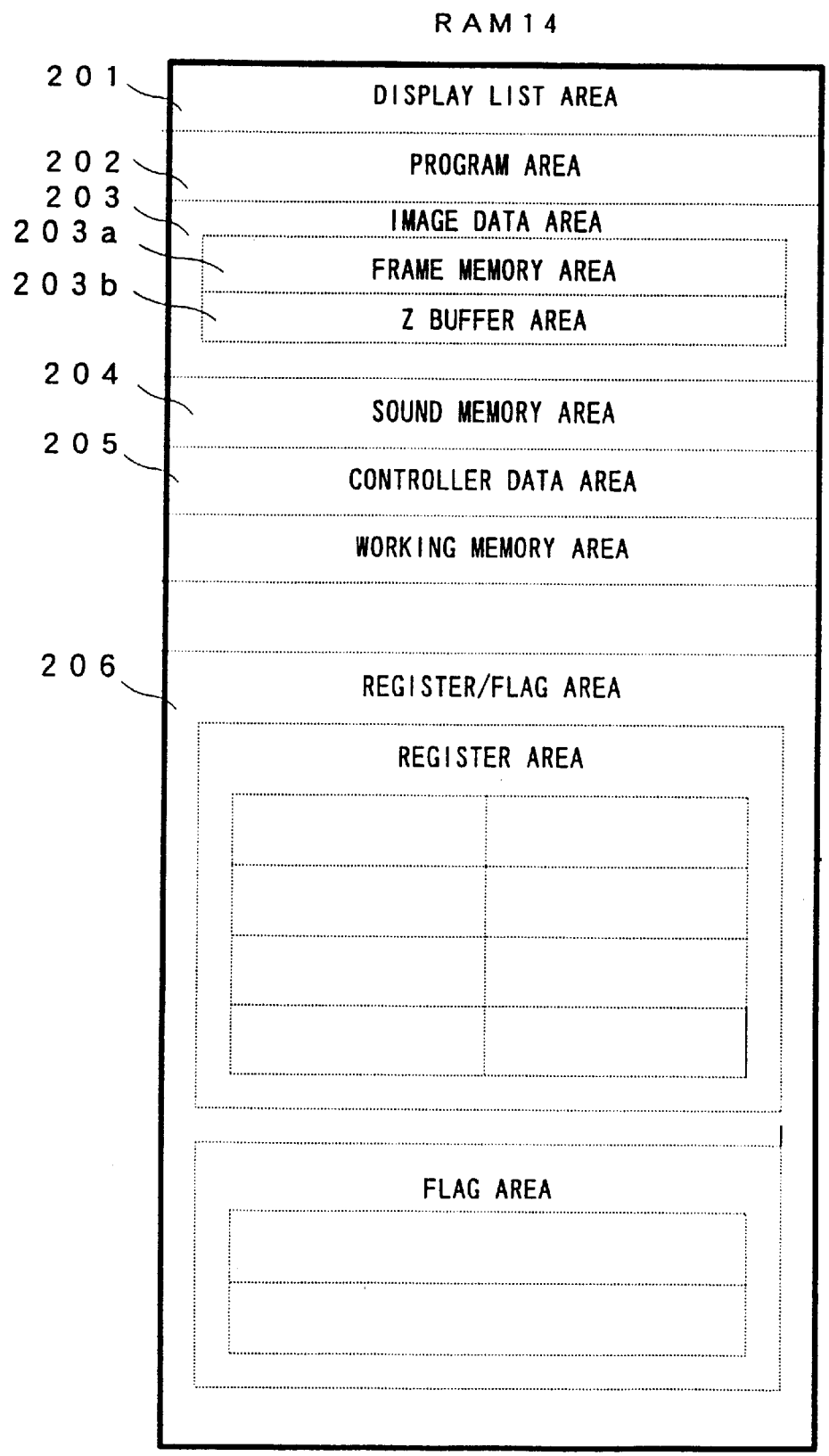
FIG. 6 is an illustrative view showing a memory map of a RAM in FIG. 2.

FIG. 6 is a memory map illustrative of a memory space of the RAM 14. The RAM 14 includes a display list area 201. When the player object or another object (including a direction indicative mark object) is to be displayed, its object No. or the like is registered in the display list area 201. The RAM 14 further includes a program area 202 and an image data area 203. The image data area 203 includes a frame memory area 203a to temporarily memorize one frame of image data, and a Z buffer area 203b to memorize, dot by dot, depth data of the frame memory area.

Figure 7:
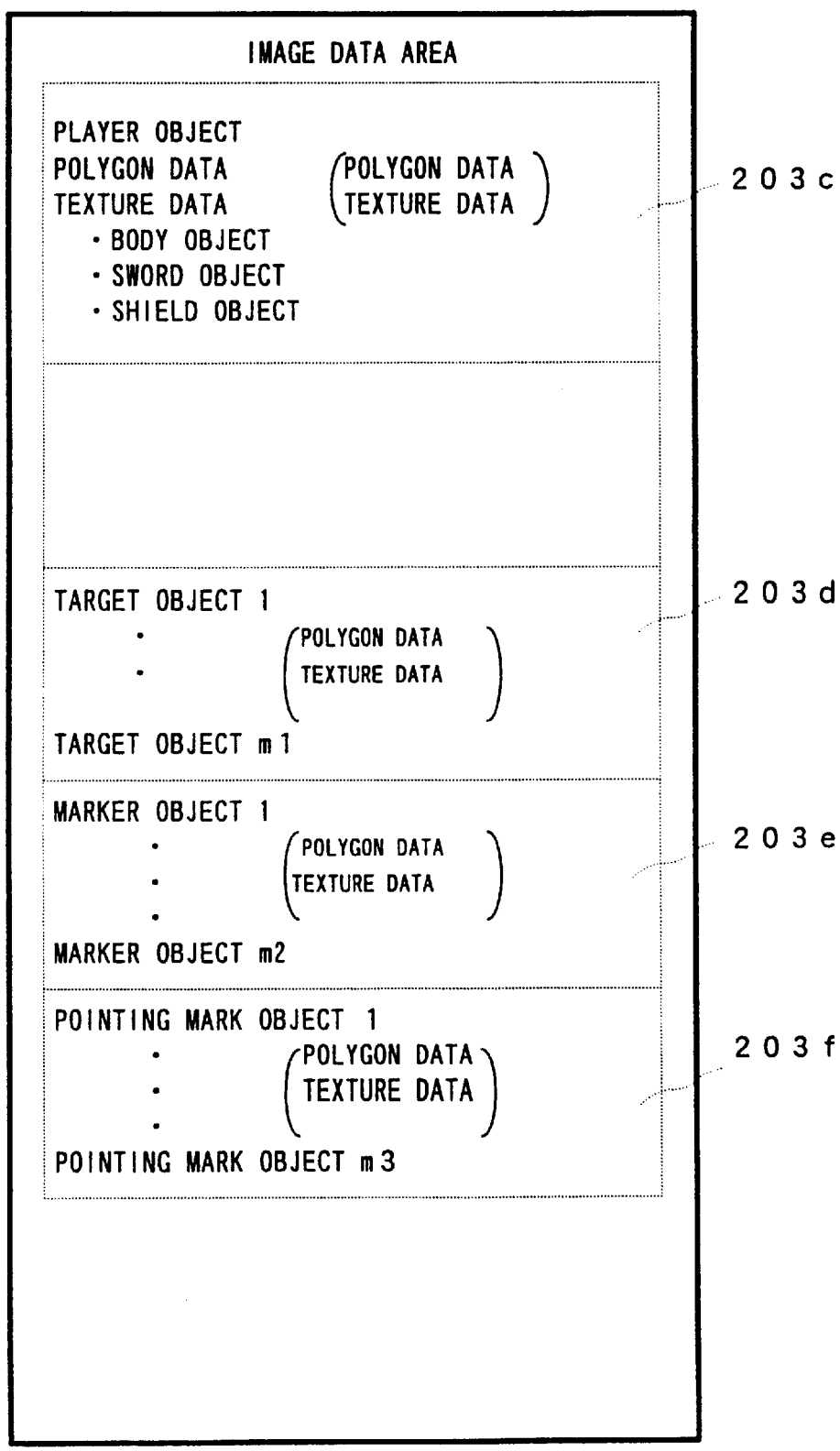
FIG. 7 is an illustrative view showing in detail an image data area included in the RAM of FIG. 6.

The image data area 203 further includes, as shown in FIG. 7, a player object image data area 203c, a target object image data area 203d, a marker object image data area 203e and a direction pointing mark object image data area 203f. The areas 203c–203f temporarily memorize therein polygon data or texture data for their respective objects.

The program data area 202 serves to temporarily memorize a program. The program data given on each area of the ROM 21 (FIG. 5) is temporarily memorized, as required, in the program data area 202. The CPU 11 and the RCP 12 (FIG. 2) make access to the program area thereby moving the game forward. Similarly, the image data area 203 (FIG. 6, FIG. 7) serves to temporarily memorize, as required, the image data stored in the ROM 21, which is directly accessible by the CPU 11 or the RCP 12. That is, the image data area 203 memorizes coordinate data and texture data for a plurality of polygons to constitute a stationary object and/or movable object stored, for game image display, in the external ROM 21, to which one course or stages of data is transferred, prior to image processing, from the external ROM 21.

A sound memory area 204 temporarily memorizes sound data of BGM or sound effects provided by the sound memory area 25 of the ROM 21, as shown in FIG. 5. A controller data memory area 205 temporarily memorizes operation status data indicative of an operation status read out through the controller 40.

Also, a flag register area 206 sets a flag, or memorizes variables or constants as required, during execution of a program by the CPU 11.

Explanations will now be given on a target, a marker and various direction pointing mark with reference to FIG. 8. The "target" includes not only an "article", such as an essential item (e.g., a treasure, weapon, etc.) that the player object is required to obtain, but also a destination (e.g., a delivery article destination, goal point, exit, etc.) where the player object has to advance. The "marker" refers to a sign which is to be put at a site, e.g., an entrance, etc., where the player object has passed at least once. The player object can easily return to the site by advancing toward the marker.

Figure 8:
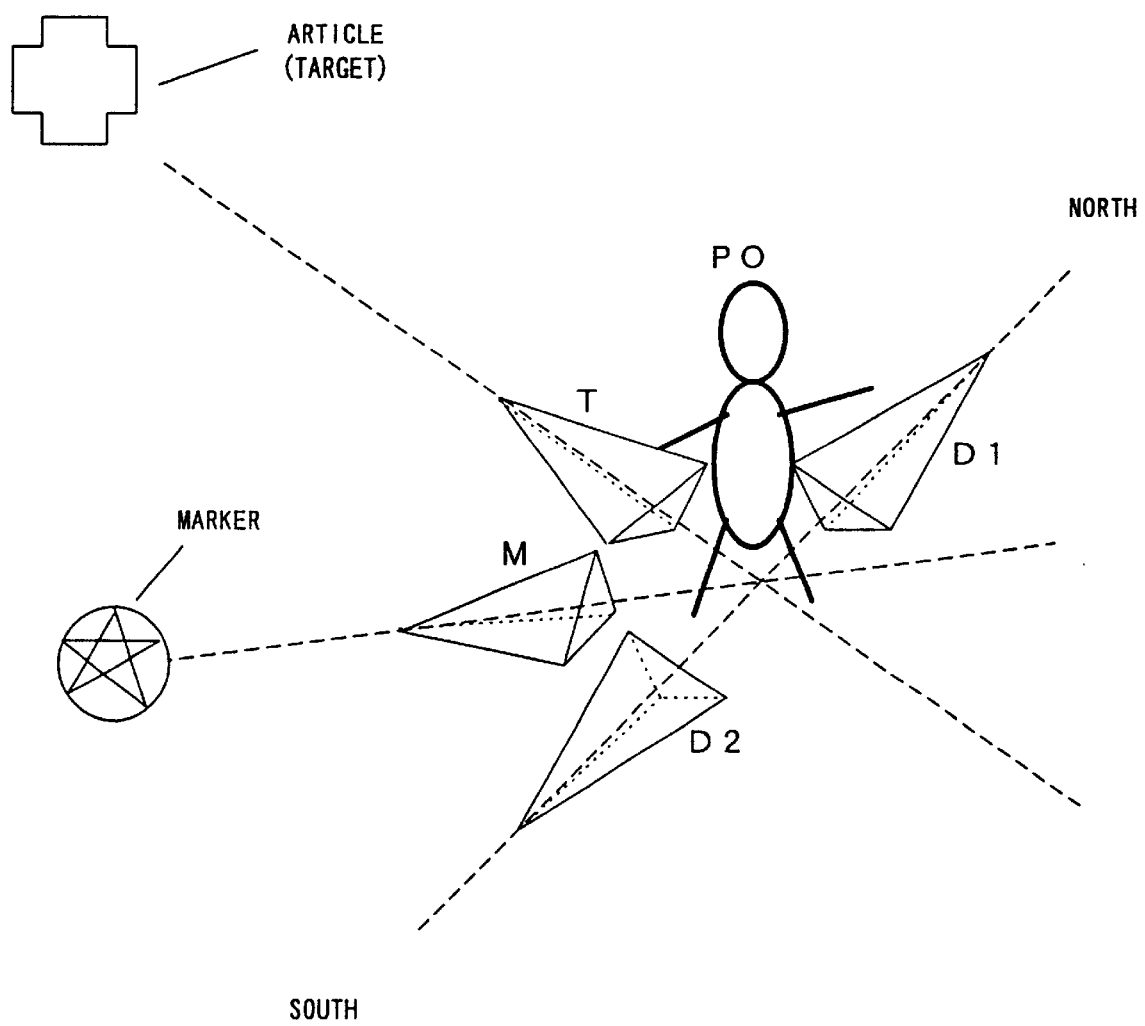
FIG. 8 is an illustrative view showing three types of direction pointing marks to be displayed in the embodiments.

A direction pointing mark in this embodiment includes three types, as shown in FIG. 8. A first direction pointing mark points to the direction of the marker described above as viewed from the player object PO. In this embodiment, a white-colored triangular pyramid (tetrahedron) points at its tip a direction in which the marker is present. The first direction pointing mark is referred to as a marker pointing mark M.

A second direction pointing mark is, for example, referred to as a target pointing mark T, which is formed, for example, by a red-colored triangular pyramid (tetrahedron) utilized to point a target (destination or article) position viewed from the player object. The target pointing mark T has a tip directed to the target. This second direction pointing mark in the embodiment differs in color from that of the first direction pointing mark, in order to distinguish therebetween. Alternatively, it may differ in shape.

A third direction pointing mark is utilized as a so-called an azimuth pointing mark D to point "North and South" in a game scene. The present embodiment includes two direction pointing marks displayed back to back in order to point "North" at one end "South" by the other end. The third direction pointing mark is different in shape, color, etc. from the first and second direction pointing marks. This third direction pointing mark is displayed to point "North" in a direction of the North Pole as viewed from the player object.

Where the first to third direction pointing marks respectively employ triangular pyramids as shown in FIG. 8, they are controlled to point at a sharpened tip a direction so that a top surface thereof represents a horizontal plane and/or an angle of elevation to a target or marker, with a ridgeline on a backside of the triangular pyramid always positioned on a straight line connecting between the player object and a target or marker or on a straight line representing an azimuth thereto. Incidentally, the first to third direction pointing marks are not limited in shape to a triangular pyramid but may be represented by an arbitrary shape, color or pattern, such as a planar triangle, bold arrow mark or tip-arrowed line.

Figure 9:
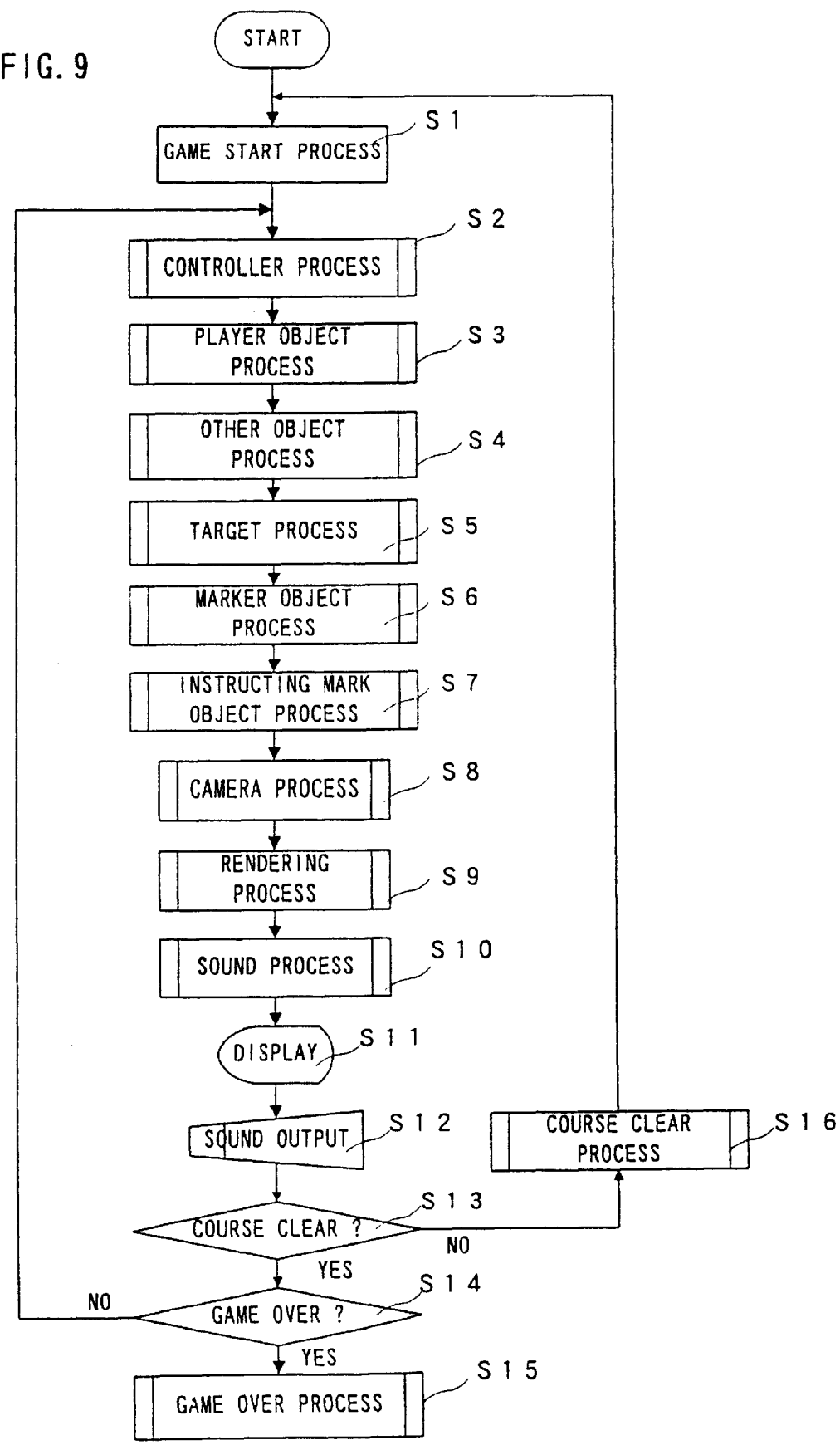
FIG. 9 is a flowchart showing overall operation of the FIG. 1 embodiment.

FIG. 9 is a main flowchart for the video game system in this embodiment. When a power is turned on, the CPU 11 at a first step S1 sets the video game machine 10 to a predetermined initial state in order to start operation. For example, the CPU 11 transfers a start program among the game programs stored in the program area 22 of the external ROM into the program area 202 of the RAM 14, and sets each parameter to an initial value and executes the steps of FIG. 9 in the order.

The operation of the main flowchart of FIG. 9 is executed, for example, every 1 frame (1/60 second) or every two or three frames, wherein steps S1–S13 are repeatedly executed before the course is cleared. If the game ends without success, a game-over process is effected at a step S14 following the course clear process of step S13. If course clear process of step 13 is successfully done, the process returns from the step S13 to the step S1.

That is, at a step S1 a game course screen and/or course opting screen is displayed. However, when the game is started after turning on the power, a first course screen is displayed. If the first course is cleared, a next course is set on.

At a step S2 following the step S1, a controller process is performed. This process includes a detection on any of which the joystick 45, cross switch 46 and switches 47A–47Z on the controller. The operation state detection data (controller data) is read in, and the controller data, thus read is written into the controller data area 205 of the RAM 14.

Figure 10:
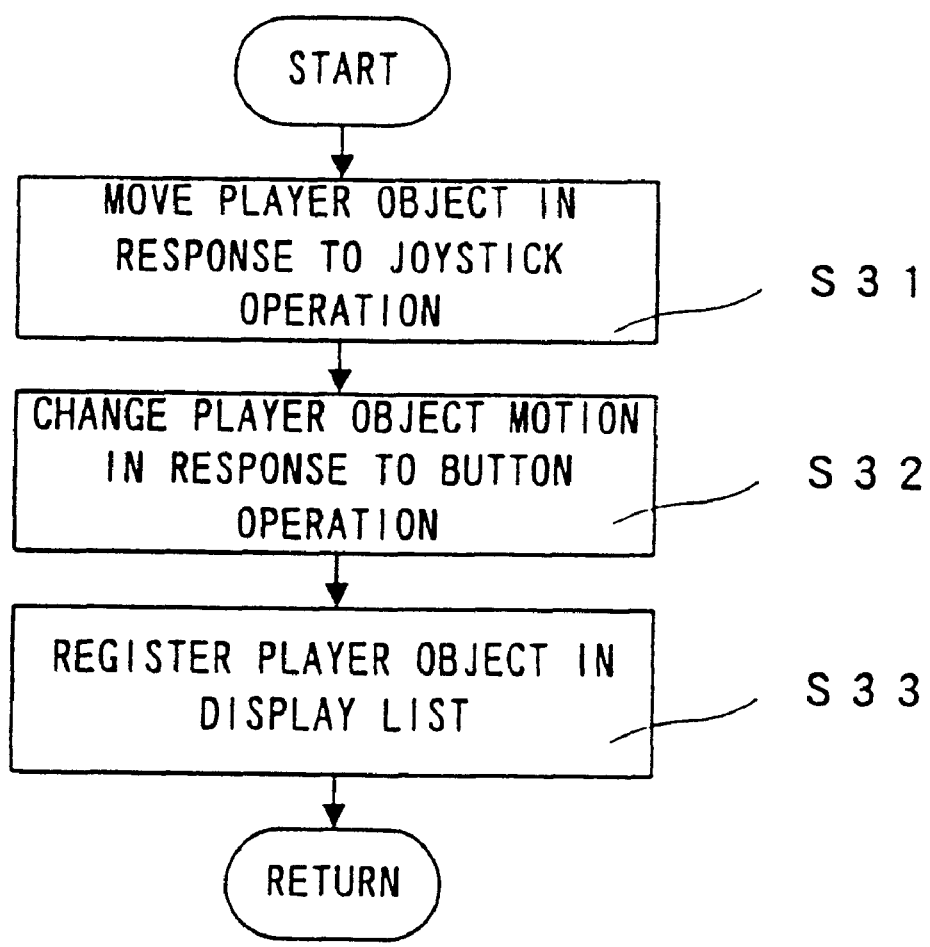
FIG. 10 is a flowchart showing in detail a player object process routine for the FIG. 9 embodiment.

At a step S3 a process for displaying a player object is performed. This process is performed by a subroutine of FIG. 10. At the first step S31 in FIG. 10, the player object is moved in response to an operating state of the player-operated joystick 45 and cross key 46 or a program transferred from the memory area 22e (FIG. 6) of the external ROM 21, the polygon data of the player object transferred from the memory area 24, and the controller data, i.e., an operating state of the joystick 45 and the cross key 46. That is, the step S31 determines coordinate data representative of a current position of a player object. At a succeeding step S32 the player object is changed in movement in response to an operating state (controller data) of the button 47 on the controller 40, to calculate polygon data after the change. The resulting polygons are given colors by putting texture data thereon. At a step S33 the relevant player object is registered to the display list area 201.

At a step S4 other objects are subjected to processing. At step S4 the display positions or shapes for other objects are calculated based on a program partly transferred from the memory area 22i and polygon data of other objects transferred from the memory area 24 (FIG. 5).

At a step S5 a process for displaying a target object is performed. This step S5 is performed by a subroutine shown in FIG. 11.

Figure 11:
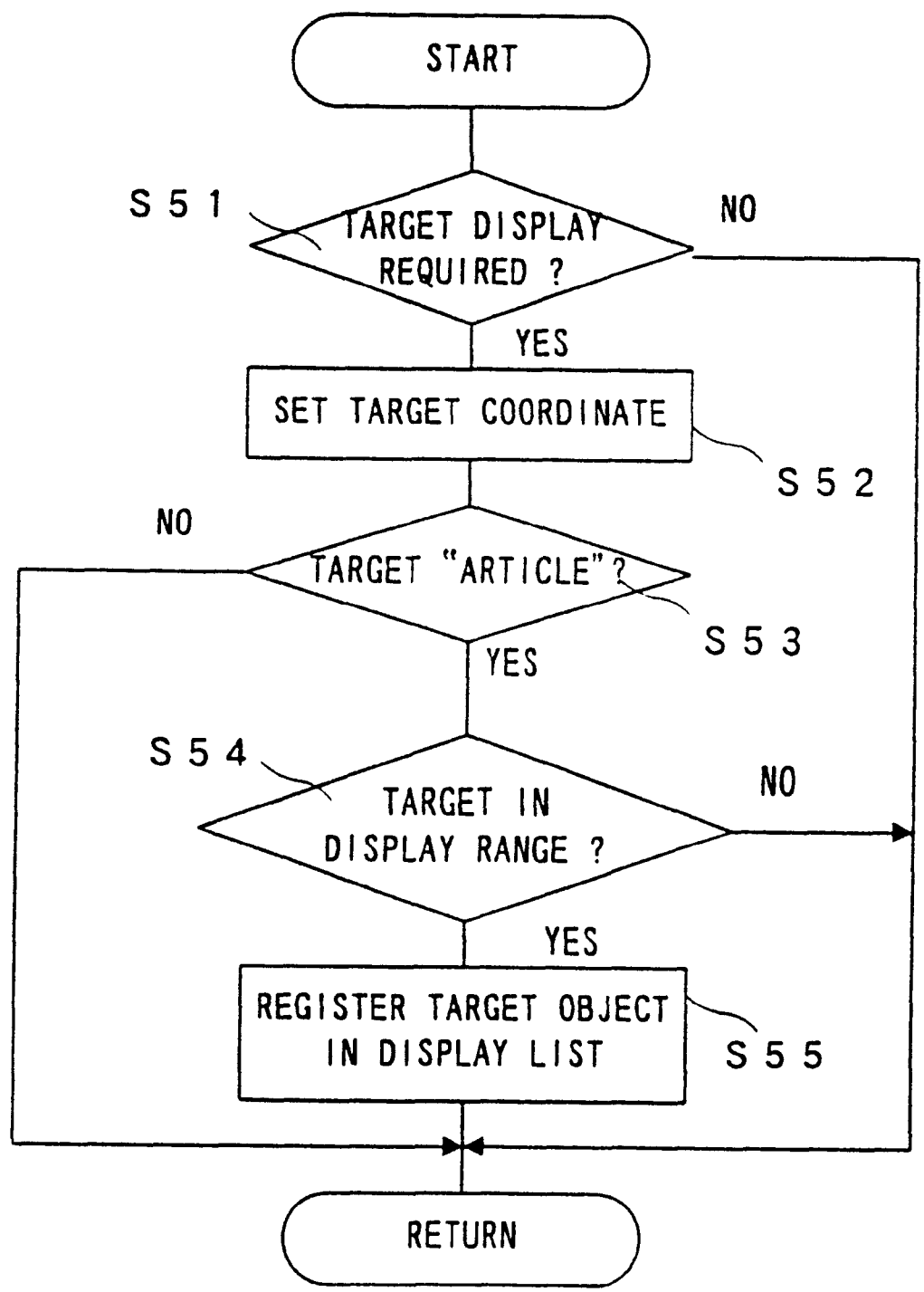
FIG. 11 is a flowchart showing in detail a target process routine for the FIG. 9 embodiment.

That is, it is determined at a first step S51 in FIG. 11 whether it is necessary at that time to display a target or not. If it is not necessary to display a target, the process returns. If it is necessary, coordinate data is set for the relevant target at a next step S52. Because the target includes not only an "article" that the player object has to obtain but also a destination where the player object is required to advance as described above. It is determined at a next step S53 whether the target is an "article" or not. That is, if the target is an "article", it is possible to display the target. However, if it is not an "article", such as a destination, it is impossible to display the target. Accordingly, determination is made at this step S53.

If "YES" is determined at the step S53, then it is determined at a step S54 whether or not the "article" target exists within a display range of the display unit 30 (FIG. 1) depending, for example, on a target coordinate display or the like. At a step S55 a target object that can be displayed is registered to the display list area 201 (FIG. 6). Incidentally, when "NO" is determined at the step S53 or S54, the process returns as it is.

In this manner, the display screen is given in a state that a target be displayable in the game scene, as shown in FIG. 8.

Figure 12:
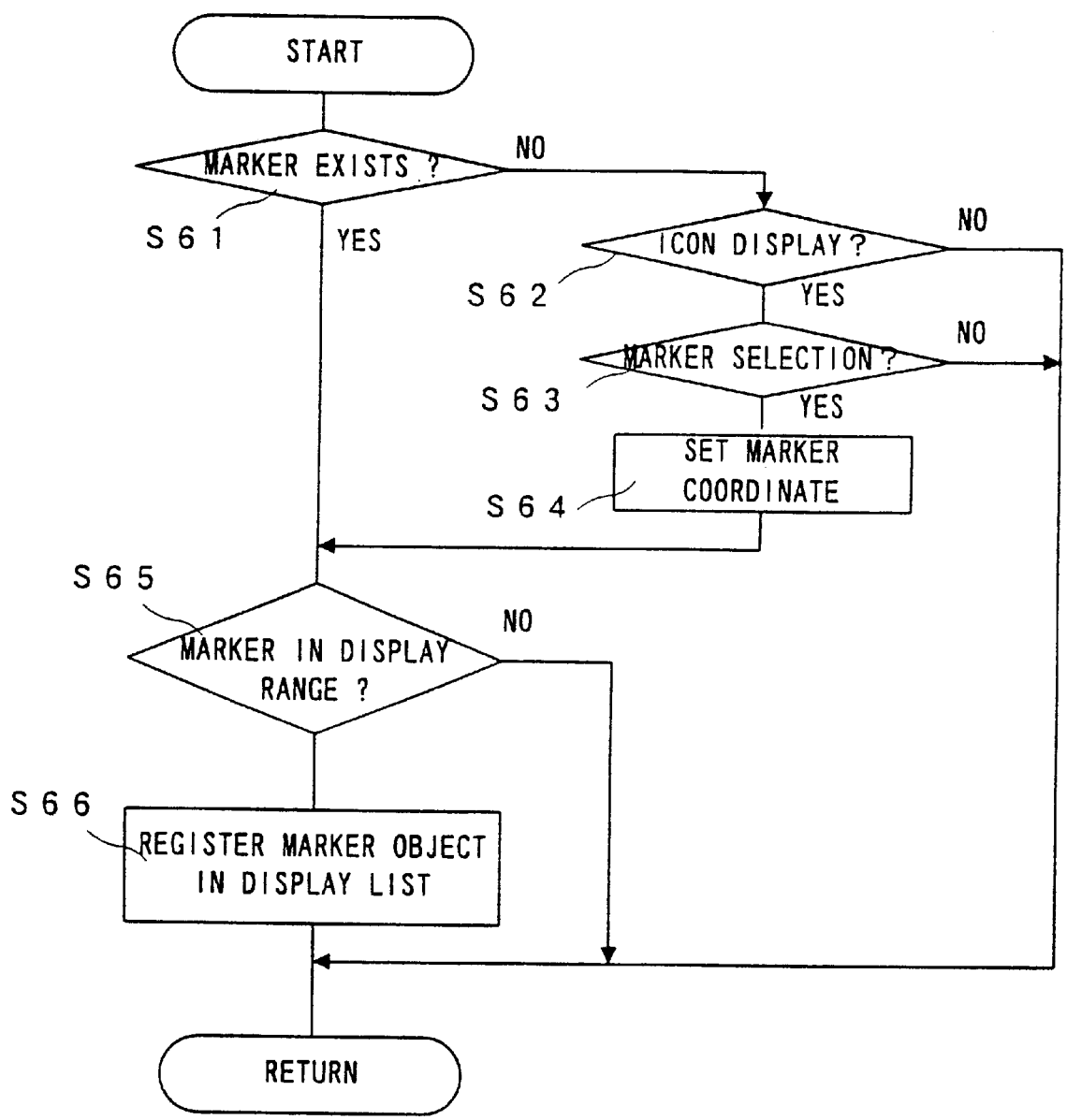
FIG. 12 is a flowchart showing in detail a marker object process routine for the FIG. 9 embodiment.
Figure 13:
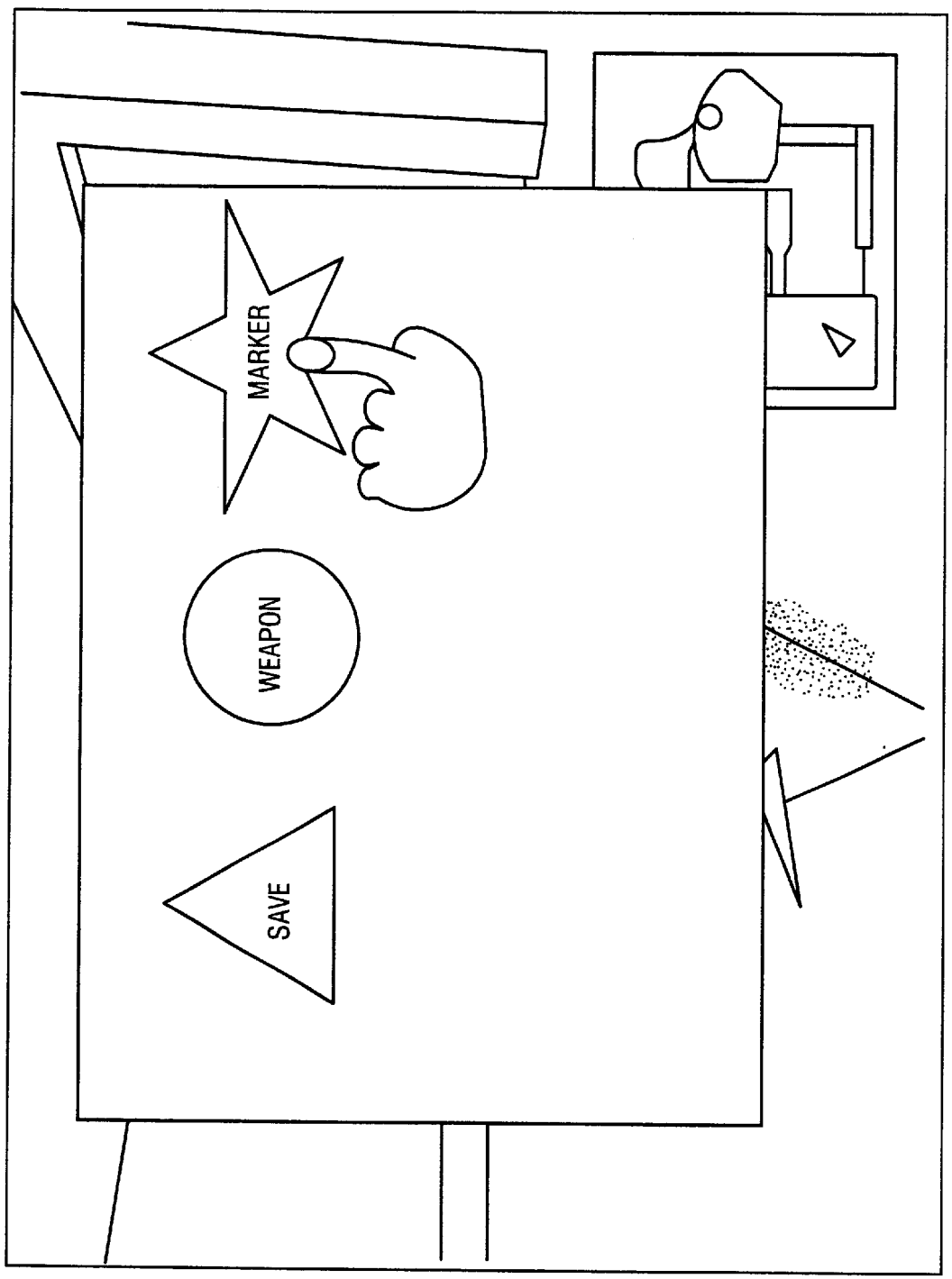
FIG. 13 is an illustrative view showing an icon displaying screen to set a marker.

Returning to FIG. 9, at a step S6 in FIG. 9, a program is executed to process and display a marker object (FIG. 8) described above. Specifically, at a first step S61 in FIG. 12 it is determined whether a marker exists or not. For example, it is determined whether or not a marker has already been put on an entrance or the ground at a branch. If "NO" is determined at this step S61, it is determined at a step S62 whether an icon for setting markers as shown in FIG. 13 is being displayed on the display screen. Note that the icon displaying screen shown in FIG. 13 is available by operating particular one or two or more buttons (switches) on the controller 40 (FIG. 1). That is, the operation of particular buttons enables marker setting. At the step S62, whether marker setting is possible or not is determined.

If it is determined at the step S62 that marker setting is possible, then at a next step S63 it is determined whether or not MARKER is selected on the icon displaying screen of FIG. 13. The MARKER icon can be selected by moving a "hand"-shaped cursor in FIG. 13 to a position to point the MARKER icon by operating the cross key 45 (FIG. 1). Accordingly, this step S63 determines whether the cursor has been moved to such a position or not.

If the MARKER icon is selected at the step S63, a coordinate for the marker is determined at a step S64 such that the marker (FIG. 8) is put on a ground immediately under the player object.

Where "YES" is determined at the step S61 or after executing the step S64, it is determined at a step S65 whether or not a marker has already been put or a newly placed marker lies within a display range. If "YES", the marker object is registered to the display list area 201. Accordingly, a marker object displayable state is established as shown in FIG. 8.

Figure 14:
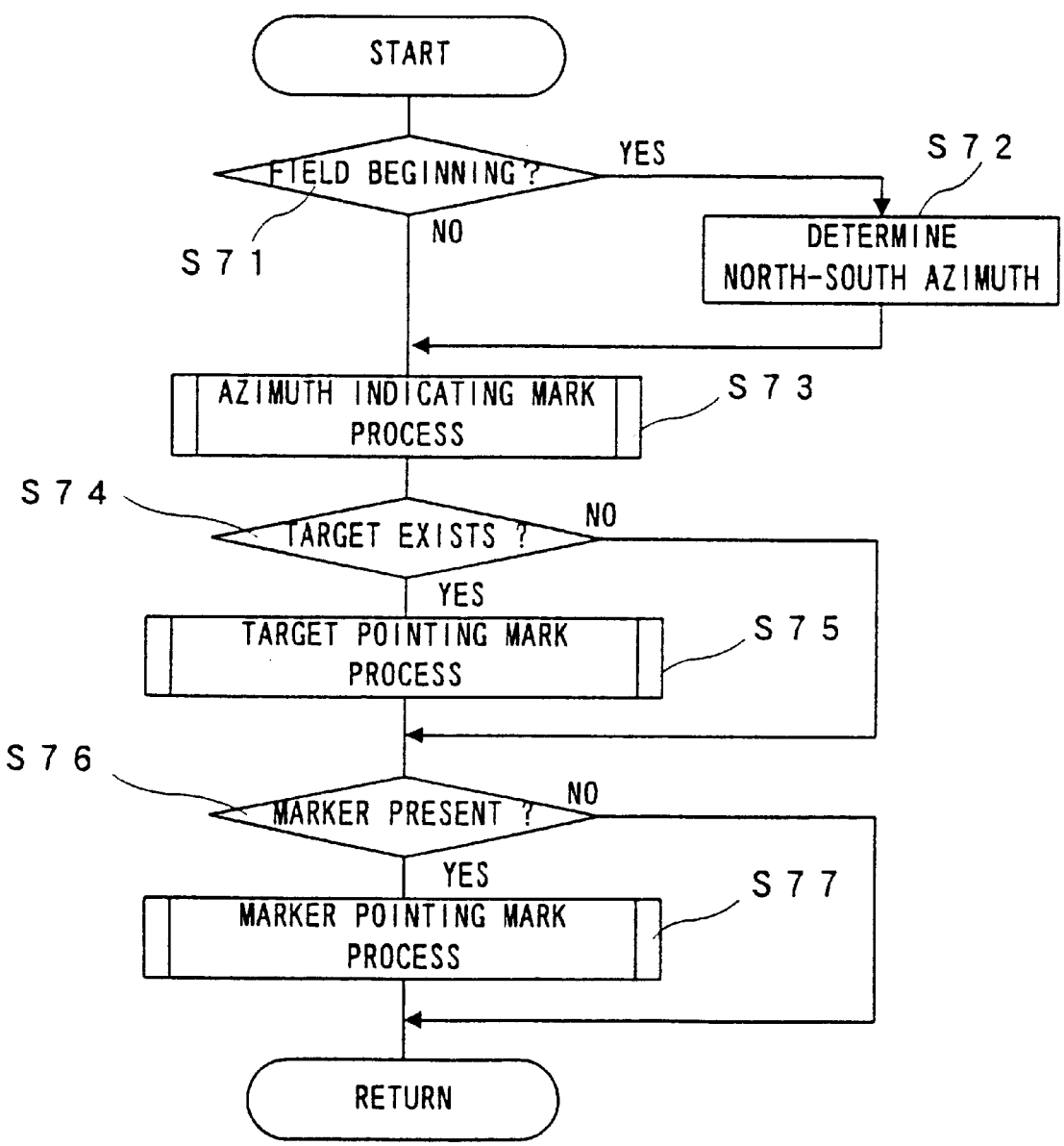
FIG. 14 is a flowchart showing in detail a pointing mark object process routine for the FIG. 9 embodiment.

At a step S7 shown in FIG. 9, a process for setting and displaying a direction pointing mark object is performed according to a flowchart shown in FIG. 14. At a first step S71 in FIG. 14, a determination is made whether it is at a field beginning of raster scanning over the display 30 (FIG. 1) or not. If it is at a field beginning, a North-and-South azimuth is determined at a step S72. Specifically, this step S72 determines, in a virtual three-dimensional space, a North Pole coordinate and sets the coordinate data therefor. In this manner, the azimuth is determined at only the field beginning, and the process advances to a next step S73. This step S73 provides processing for a third direction pointing mark, i.e., azimuth pointing mark.

Figure 15:
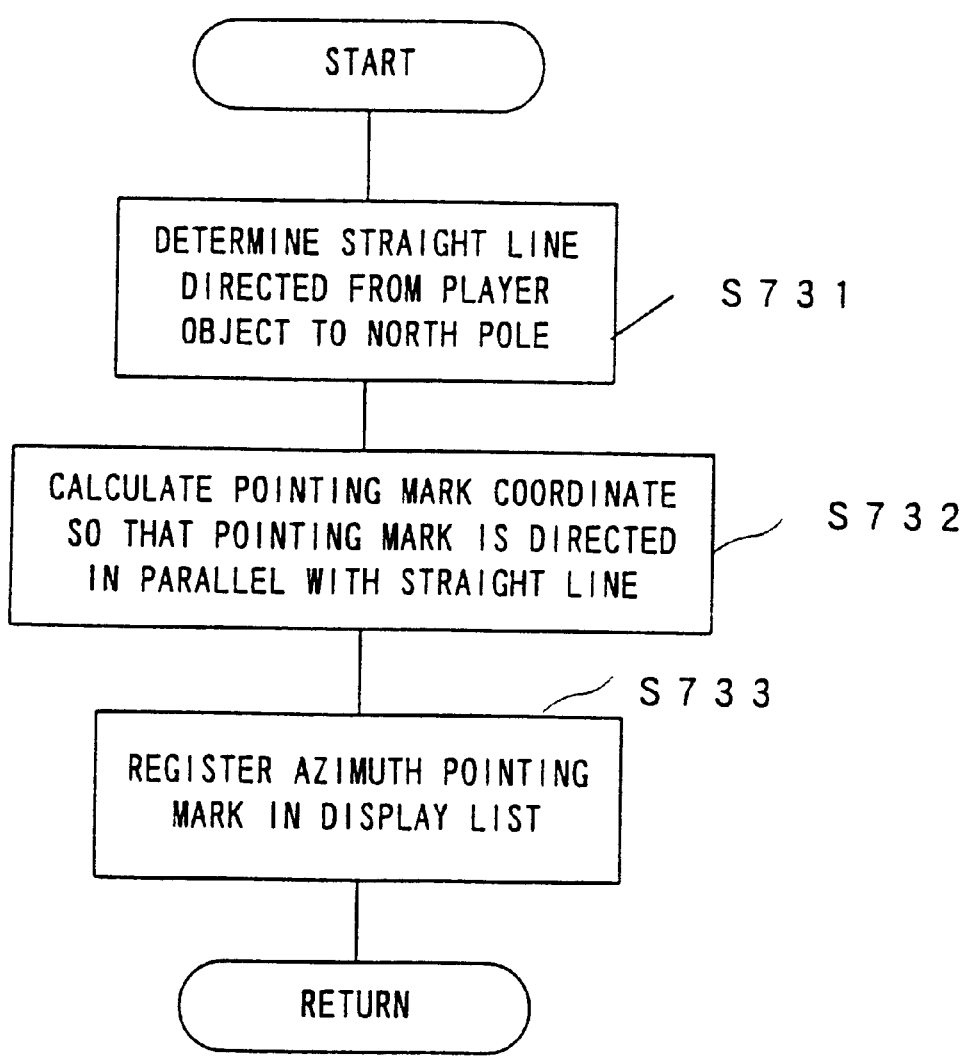
FIG. 15 is a flowchart showing in detail an azimuth pointing mark process routine for the FIG. 15 embodiment.

Specifically, at a first step S731 in FIG. 15, a direction is determined in which the North Pole is viewed from the player object PO shown in FIG. 8. That is, a straight line is determined that connects two coordinates based on the player object coordinate data determined by the step S31 (FIG. 10) and the North Pole coordinate data determined by the step S72 (FIG. 14). Then at a step S732 an azimuth pointing mark (third direction pointing mark) is calculated as to coordinate such that it is directed parallel to that line. Because the direction pointing mark in this embodiment is a triangular pyramid, the azimuth pointing mark is determined by its two point coordinates such that a top and a bottom surface center are positioned on the previously-determined straight line (or a straight line parallel to that straight line). At a step S733 the azimuth pointing mark is registered to the display list area 201 so that the azimuth pointing mark (third direction pointing mark) is rendered in a displayable state.

Figure 16:
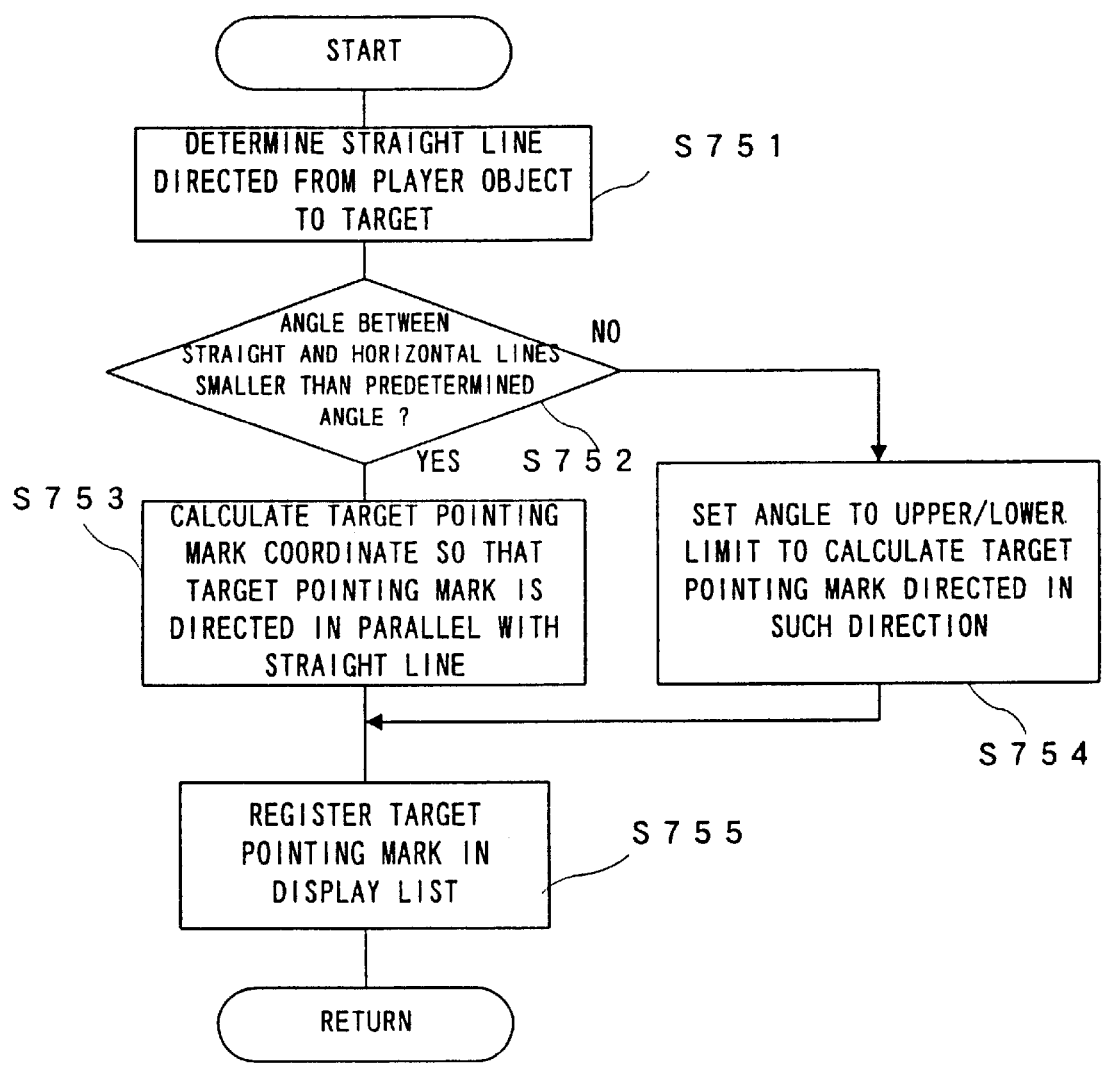
FIG. 16 is a flowchart showing in detail a target pointing mark process routine for the FIG. 14 embodiment.

Returning to FIG. 14, at a step S74 after the step S73, it is determined whether a target has been set or not. If a target has been set, a step S75 is executed according to a flowchart shown in FIG. 16. At a first step S751 in FIG. 16, a direction is determined in which the target is viewed from the player object PO shown in FIG. 8. That is, a straight line connecting two coordinates is determined based on the player object coordinate data determined by the step S31 (FIG. 10) and the target coordinate data set by the former step S52 (FIG. 11).

Figure 17:
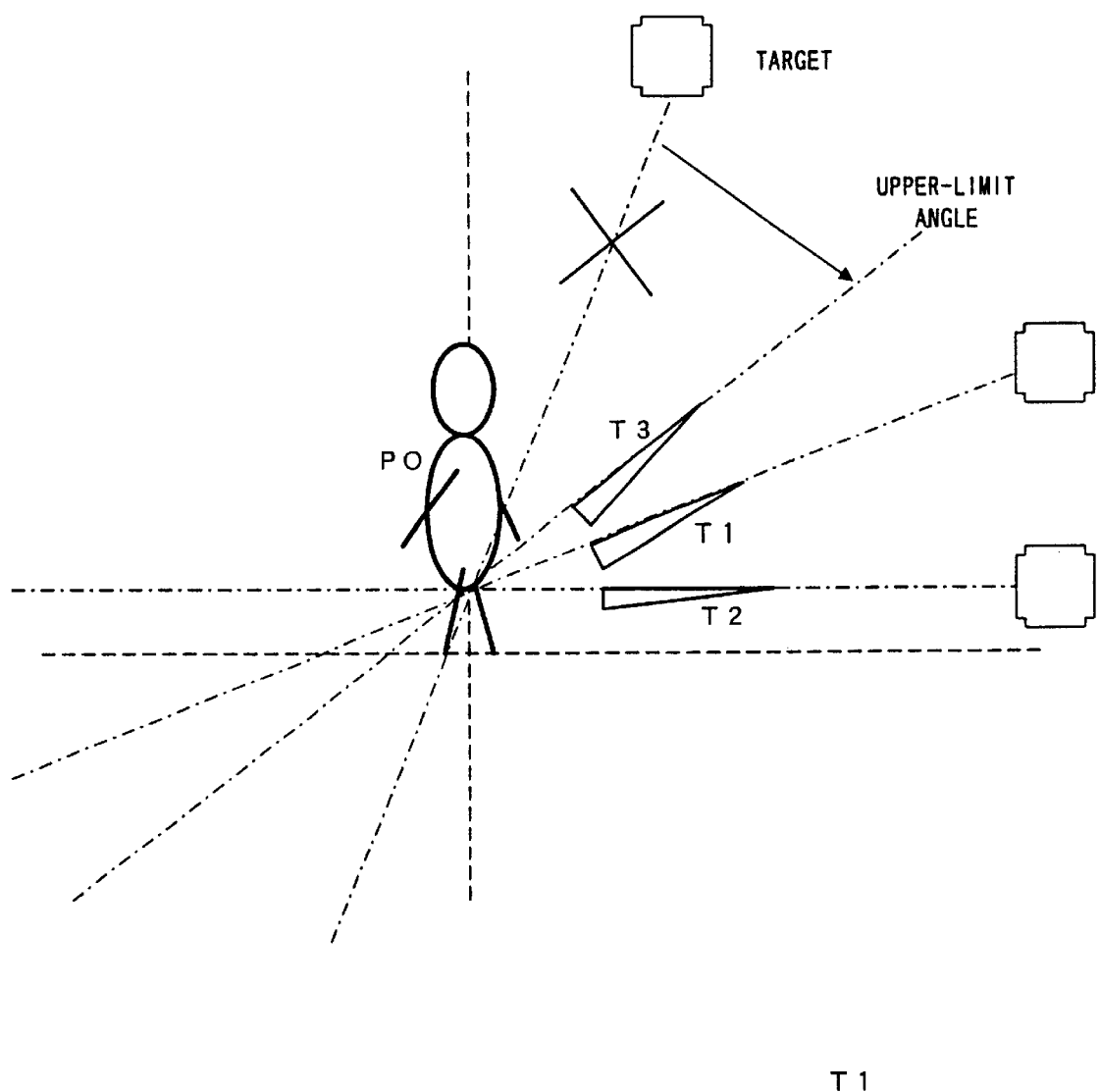
FIG. 17 is an illustrative view showing a display example of a target pointing mark.

At a next step S752 it is determined whether an angle of that straight line with respect to a horizontal line is equal to or smaller than a predetermined angle or not. This is because, if the angle given by the straight line and the horizontal line is excessively great as shown in FIG. 17, the direction pointing mark rises in position and loses its direction-pointing role (the point that the direction pointing mark points becomes obscure). Due to this, when the angle is greater than a given degree, pointing to a direction in which the target exists is not made. That is, the target pointing mark (second direction pointing mark) is allowed to indicate an actual direction to the target only when the angle given by the straight line and the horizontal line is at a predetermined angle or smaller.

If "YES" is determined at the step S752, that is, when the angle given by the straight line and the horizontal line is smaller than a predetermined angle, a coordinate for the target pointing mark (second direction pointing mark) is calculated such that it is directed to parallel with the straight line. That is, the target pointing mark is determined coordinates at two points such that a top and a bottom surface center of the target pointing mark triangular pyramid are positioned on the previously-determined straight line (or on a straight line parallel with that straight line). Accordingly, in this case the target pointing mark indicates a direction in which the target actually exists as shown by the target pointing mark T1 or T2 in FIG. 17.

If "NO" is determined at the step S752, that is, when the angle between the straight line and the horizontal line exceeds a predetermined angle, then at a step S754 another straight line is determined with the predetermined angle taken as an upper or lower limit to calculate a target pointing mark coordinate so that the target pointing mark is directed in a direction parallel to this other straight line. That is, the target pointing mark is determined by coordinates at two points such that the top and the bottom surface center of the direction pointing mark triangular pyramid are positioned on the determined other straight line (or a straight line in parallel with that other straight line). In this case the target pointing mark indicates a direction given by the upper-limit angle as shown by a target pointing mark T3 in FIG. 17, in which direction no target exists.

At a step S755 the target pointing mark is registered in the display list area 201 so that the target pointing mark (second direction pointing mark) is rendered in a displayable state.

Returning to FIG. 14, it is determined at a step S76 after the step S75 whether a marker has been set or not. If a marker has been set, a step S77 is executed according to a flowchart shown in FIG. 18.

Figure 18:
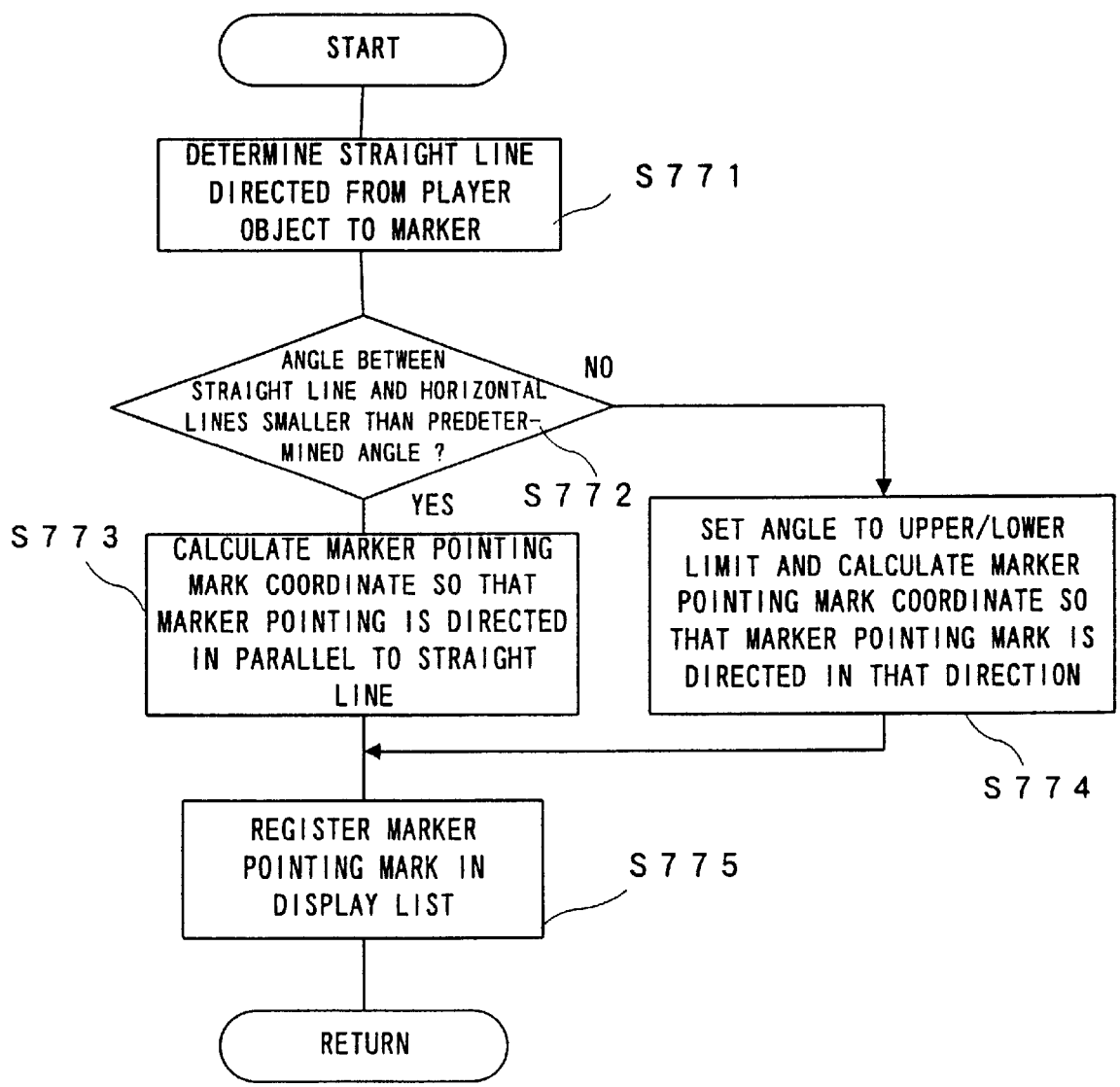
FIG. 18 is a flowchart showing in detail a marker pointing mark process routine for the FIG. 14 embodiment.

At a first step S771 in FIG. 18, a direction is determined in which a marker is viewed from the player object PO shown in FIG. 8. That is, a straight line connecting two coordinates is determined based on the player object coordinate data determined by the step S31 (FIG. 10) and the marker coordinate data set by the step S64 (FIG. 12).

It is then determined at a step S772 whether or not an angle given by the straight line and the horizontal line is at a predetermined angle or smaller. This is due to the same reason as the case stated as to the target pointing mark.

If "YES" is determined at the step S772, that is, when the angle between the straight line and the horizontal line is at predetermined angle or smaller, a coordinate for the maker pointing mark (first direction pointing mark) is calculated at a step S773 such that it is directed in a direction parallel to this straight line. That is, the marker pointing mark is determined by coordinates at two points such that the top and bottom surface center of the marker pointing mark triangular pyramid are positioned on the determined straight line (or a line in parallel with that straight line). Accordingly, in this case the marker pointing mark indicates a direction in which the marker is actually put on.

If "NO" is determined at the step S772, that is, when the angle between the straight line and the horizontal line exceeds a predetermined angle, then at a step S774 another straight line is determined with the predetermined angle taken as an upper or lower limit to calculate a marker pointing mark coordinate such that the marker pointing mark is directed a direction parallel to this other straight line. In this case, the marker pointing mark points a direction that is given by the upper-limit angle but no marker actually exists therein.

At a step S775 the marker pointing mark is registered in the display list area 201, to put the marker pointing mark (first direction pointing mark) in a displayable state.

Returning to FIG. 9, a camera process is performed at a step S8. For example, a coordinate of a point of sight with respect to each object is determined such that a line or field of sight as viewed through a camera viewfinder assumes an angle designated through the joystick 45 by the player. The hypothetical camera is controlled in position (point of sight) or line direction of sight is controlled basically by the joystick 45.

Figure 19:
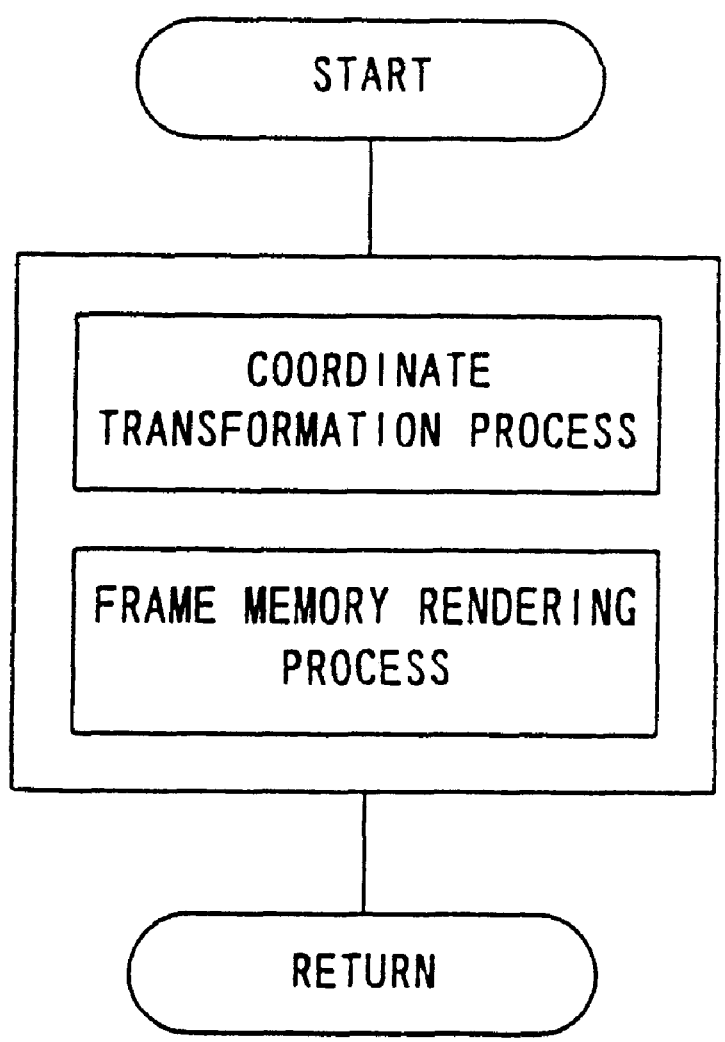
FIG. 19 is an illustrative view showing a rendering process routine for the FIG. 9 embodiment.

At a step S9 the RSP 122 performs a rendering process. That is, the RCP 12 performs transformation processing (coordinate transformation process and frame memory rendering process shown in FIG. 19), under the control of the CPU 11, to display each object based on the texture data for object memorized in the image data area 203 of the RAM 14.

Specifically, each object is developed by two-dimensional bit-map image data in consideration of a position of the hypothetical camera (i.e., in a manner distinguishing between visible and invisible portions), based on three-dimensional coordinate data of a plurality of polygons for constituting the object. The texture data instructs what color, pattern or material feeling is put to an inside of a triangle defined by the three-dimensional coordinate data of each polygon. The texture data is color data as considered on one dot of a bit map image. That is, the texture data is converted into color data. The color data of each dot of the bit map image is written into the frame memory 203a (FIG. 6), while the depth data thereof is written into a Z buffer 203b (FIG. 6). By thus performing coordinate transformation and rendering process on each polygon, the player object or other objects (including enemy objects, stationary objects, direction pointing marks and markers) existing in the virtual three-dimensional space can be displayed in a two-dimensional fashion.

At a step S10 in FIG. 9, the CPU performs a sound process based on sound data, such as message, music, sound effects, etc.

At a step S11 the CPU 11 reads out image data memorized in the frame memory area of the RAM 14, as a result of the rendering process at the step S9. Accordingly, the player object or other objects existing in the virtual three-dimensional space is displayed in the game scene on the display 30 (FIG. 1, FIG. 2), as shown in FIG. 20.

Figure 20:
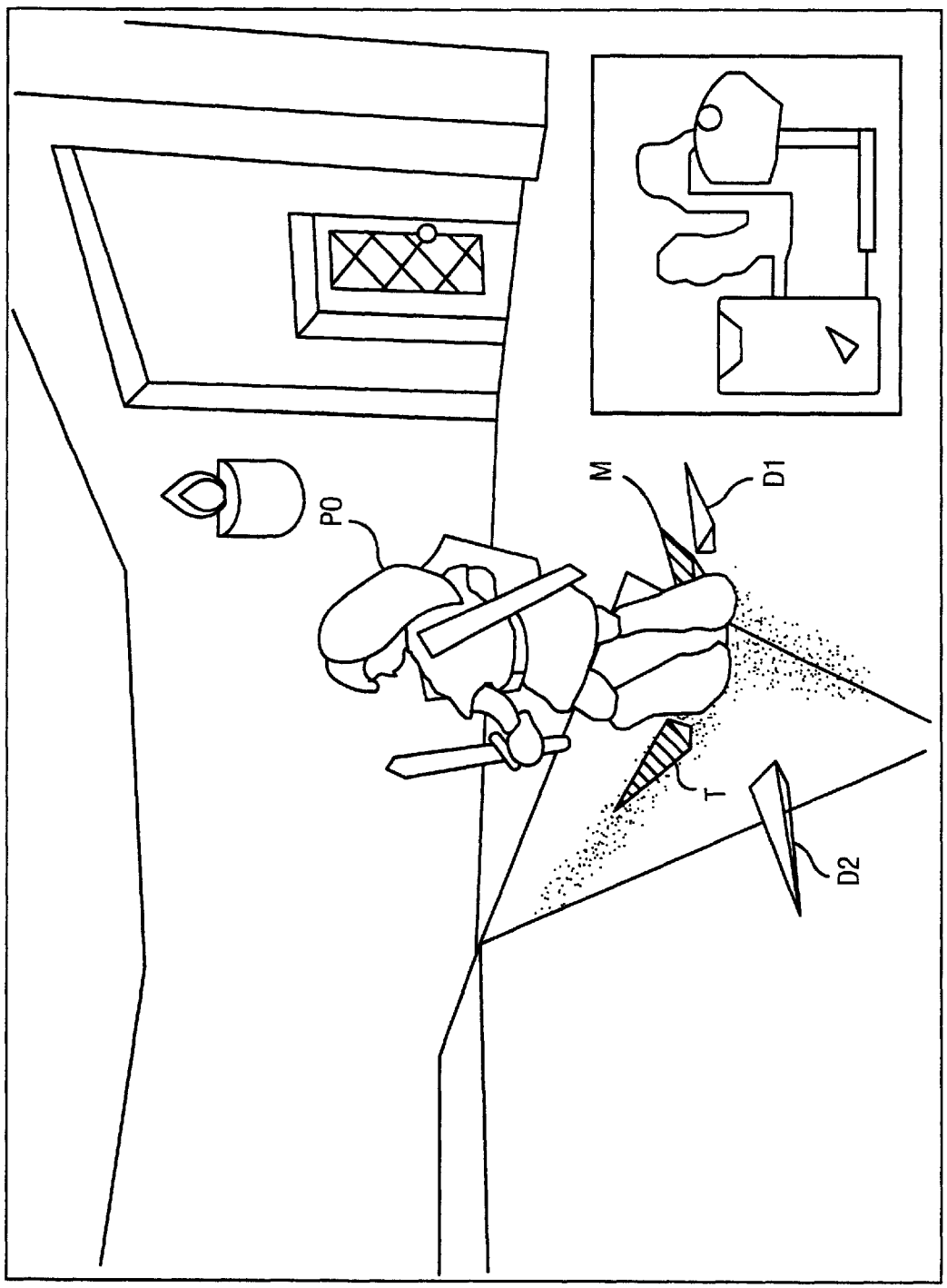
FIG. 20 is an illustrative view showing one example of an actual game scene.

FIG. 20, illustrates besides the player object PO, a first direction pointing mark, i.e. marker instructing mark M, a second direction pointing mark, i.e., target pointing mark T, and a third direction pointing mark, i.e., azimuth pointing mark D1, D2. Consequently, the player may operate the analog joystick 45 (FIG. 1) so that the player object PO is moved in a direction according to these direction pointing marks. Therefore, the player object PO is comparatively easy to control in its movement. Thus the player object PO can be moved at a rapid speed in a desired direction.

Figure 21:
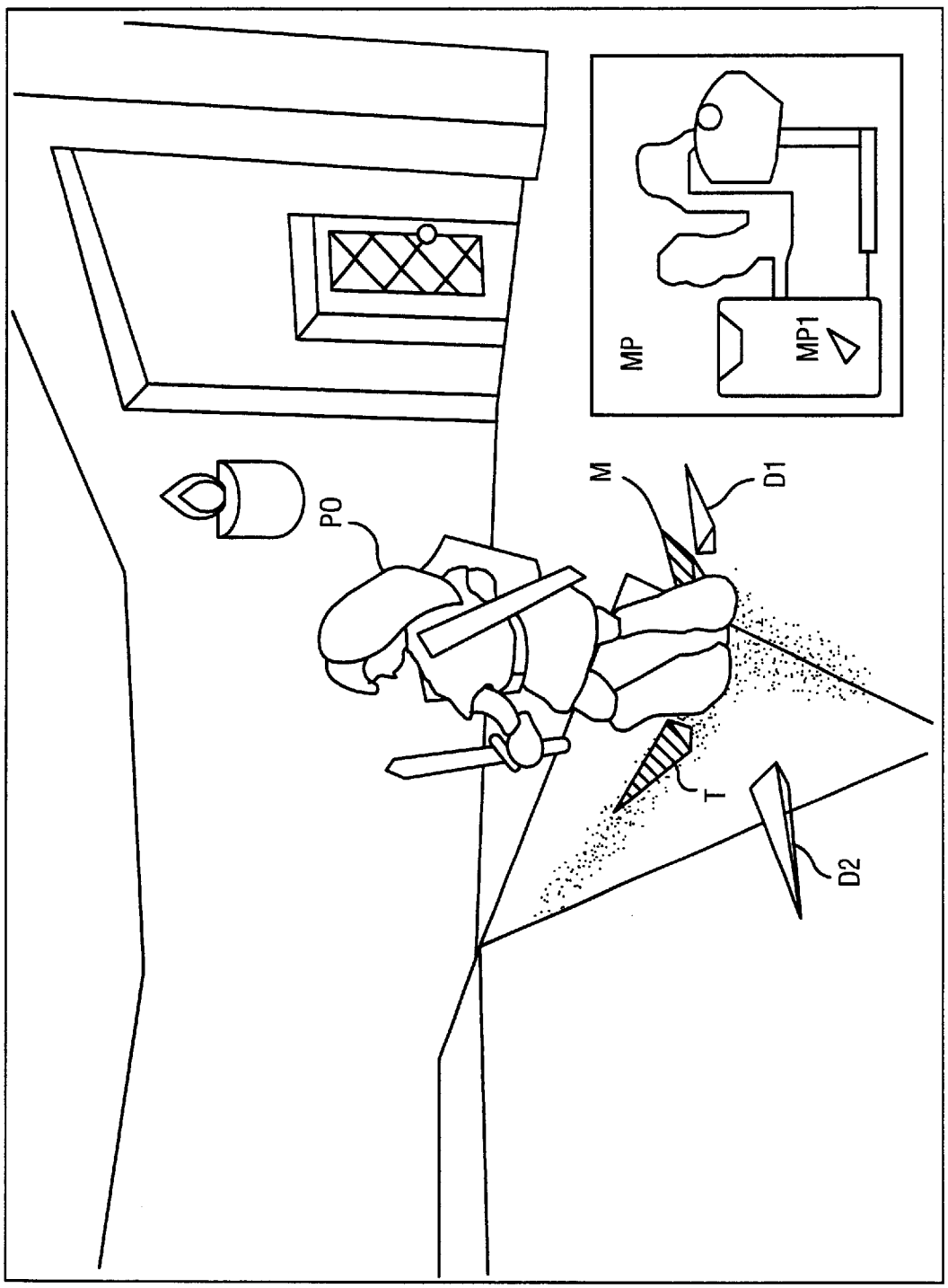
FIG. 21 is an illustrative view showing another example of an actual game scene.

Incidentally, a map screen MP may be separately created, in addition to displaying the direction pointing marks in the game screen, as shown in FIG. 21. In this case, however, a direction pointing mark MP1 provided within the map screen MP will indicate a direction in which the player object PO is directed.

At a step S12 the sound data obtained as a result of the sound processing by the RCP 12 at the step S10 is read out, to thereby output sound, such as music, sound effects or speech.

At a step S13 of FIG. 9, whether the course has been cleared or not is determined (course clear detection). If the course is not cleared, it is determined at a step S14 whether the game is over or not. If the game is not over, the process returns to the step S2 to repeat the steps S2–S14 until a game-over condition is detected. If a game-over condition is detected i.e., that the number of mistakes permitted to the player reaches a predetermined number of times or the life of the player object is consumed by a predetermined amount, then a game-over process is performed at a succeeding step S16 that includes selection for game continuation or backup data memorization.

Incidentally, if a condition of clearing the course (e.g., defeating a course, etc.) is detected at a step S13, a course-clear process is formed at a step S16 and then the process returns to a step S1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A three dimensional display video game apparatus comprising:

a player controller including a direction control member to instruct a direction in movement of a player object so that when the player object is placed within a virtual three dimensional space, image data for displaying the player object as viewed from a certain point of sight is generated and supplied to a display to thereby provide such a game scene that the player object can be moved to a predetermined region on a screen of said display in accordance with an indication of said direction control member, wherein said video game apparatus includes a display generating processing system, said display generating processing system being operable to determine a three dimension coordinate position of said player object and to generate a direction pointing mark having a pointing direction variable determined based upon said three dimension coordinate position of the player object which is displayed at a location close to the player object on the game scene.

2. A three dimensional display video game apparatus having, in operative association therewith, a player controller including a direction control member to instruct a direction in movement of a player object so that when the player object is placed within a virtual three dimensional space, image data for displaying the player object as viewed from a certain point of sight is generated and supplied to a display unit, said video game apparatus comprising:

an image data generator for generating image data to display the player object and a direction pointing mark;

a player object coordinate data generator for generating player object coordinate data representative of a current position of the player object in said virtual three dimensional space based upon an operating state of said direction control member;

a pointed-subject data generator for generating data of a pointed-subject to be pointed by the direction pointing mark;

a pointing direction determiner for determining a pointing direction of the direction pointing mark in said virtual three dimensional space based on the pointed-subject data and the player object coordinate data;

a direction pointing mark data generator for generating direction pointing mark data to display the direction pointing mark at a location close to the player object and in a direction determined by said pointing direction determiner; and a display data generator for generating display data according to the image data, the player object coordinate data and the direction pointing mark data, in order to combine the player object with the direction pointing mark to display a two-dimensional combined image on said display unit.

3. A three dimensional display video game apparatus according to claim 2, wherein said pointed-subject data generator generates target coordinate data representative of a coordinate position of a target existing in a direction that the player object is to advance, said pointing direction determiner determines a direction of the direction pointing mark based on the target coordinate data and the player object coordinate data such that the direction pointing mark points to a direction in which the target is viewed from the player object, and said direction pointing mark data generator generates data for a target pointing mark to point to a direction of the target.

4. A three dimensional display video game apparatus according to claim 3, wherein said pointing direction determiner determines a straight line connecting between the player object and the target based on the target coordinate data and the player object coordinate data, and determines the pointing direction such that the pointing direction of the target pointing mark is along the straight line.

5. A three dimensional display video game apparatus according to claim 2, wherein said pointing direction determiner determines a direction of the direction pointing mark such that the direction pointing mark indicates a direction in which the player object is to move to a particular azimuth point in said virtual three dimensional space based on the player object coordinate data, and said direction pointing mark data generator generates data for an azimuth pointing mark to point the particular azimuth point as viewed from the player object.

6. A three dimensional display video game apparatus according to claim 5, wherein said pointing direction determiner determines a straight line connecting between the player object and the particular azimuth point based on the particular azimuth point coordinate data and the player object coordinate data, and determines the pointing direction such that the pointing direction of the azimuth pointing mark is along the straight line.

7. A three dimensional display video game apparatus according to claim 2, wherein said pointed-subject data generator generates target coordinate data representative of a coordinate point of a target existing in a direction that the player object is to advance, said pointing direction determiner determines a direction of the direction pointing mark such that the direction pointing mark indicates a direction in which the target is viewed from the player object based on the target coordinate data and the player object coordinate data, and determines a direction of the direction pointing mark such that the direction pointing mark indicates a direction in which the player object is to move to a particular azimuth point in said virtual three dimensional space based on the player object coordinate data, and said direction pointing mark data generator generates data for a target pointing mark to indicate a direction of the target and data for an azimuth pointing mark to indicate a direction of the target and data for an azimuth pointing mark to indicate the particular azimuth point as viewed from the player object.

8. A three dimensional display video game apparatus according to claim 7, wherein said direction pointing mark data generator generates a direction pointing mark data to display the target pointing mark and the azimuth pointing mark in a display form different from each other.

9. A three dimensional display video game apparatus according to claim 2, wherein said pointed-subject data generator generates marker data representative of a marker set on a path that the player object has passed, said direction determiner determines a direction of the direction pointing mark such that the direction pointing mark indicates a direction in which the player object is to move toward the marker in said virtual three dimensional space based on the player object coordinate data and coordinate data for the marker, and said direction pointing mark data generator generates data of a marker direction pointing mark to indicate the marker as viewed from the player object.

10. A three dimensional display video game apparatus according to claim 9, wherein said direction determiner determines a straight line connecting between the player object and the marker based on coordinate data of the marker and the player object coordinate data, and determines the pointing direction such that the pointing direction of the marker direction pointing mark is along the straight line.

11. A three dimensional display video game apparatus according to claim 2, wherein said image data generator generates image data to display said direction pointing mark in such a shape that is thinned in a direction from the player object to a pointed-subject.

12. A three dimensional display video game apparatus comprising:

a player controller including a direction control member to instruct a direction in movement of a player object so that when the player object is placed within a virtual three dimensional space, image data for displaying the player object as viewed from a certain point of sight is generated and supplied to a display to thereby provide such a game scene that the player object can be moved to a predetermined region on a screen of said display in accordance with an indication of said direction control member, wherein a direction pointing mark having a pointing direction variable depending upon a position of the player object is displayed at a location close to the player object on the game scene, and an image data generator which generates image data to display said direction pointing mark in such a shape that is thinned in a direction from the player object to a pointed-subject.

13. A computer readable memory medium encoded with a computer program for use in a three dimensional display video game apparatus having, in operative association therewith, a player controller including a direction control member to instruct a direction in movement of the player object so that when the player object is placed within a virtual three dimensional space, image data for displaying the player object as viewed from a certain point of sight is generated and supplied to a display unit, said computer readable memory medium comprising:

an image data generating area for causing said video game apparatus to generate image data to display the player object and a direction pointing mark;

a player object coordinate data generating program for causing said video game apparatus to generate player object coordinate data representative of a current position of the player object in said virtual three dimensional space based upon an operating state of said direction control member;

a pointed-subject data generating program for causing said video game apparatus to generate data of a pointed-subject to be pointed by the direction pointing mark;

a pointing direction determining program for causing said video game apparatus to determine a pointing direction of the direction pointing mark in said virtual three dimensional space based on the pointed-subject data and the player object coordinate data;

a direction pointing mark data generating program for causing said video game apparatus to generate a direction pointing mark data to display the direction pointing mark at a location close to the player object and in a direction determined by said direction determining program; and a display data generating program for causing said video game apparatus to generate display data according to the image data, the player object coordinate data and the direction pointing mark data, in order to combine the player object with the direction pointing mark to display a two-dimensional combined image on said display unit.

14. A method of operating a game in which a player object is displayed on a display unit comprising:

receiving a direction instruction for movement of the player object so that when the player object is placed within a virtual three dimensional space, the player object is displayed as viewed from a certain point of sight and supplied to said display unit to thereby provide such a game scene that the player object can be moved to a predetermined region on a screen of said display in accordance with an indication of said direction instructions;

determining a three dimensional coordinate position of said player object;

displaying a direction pointing mark having a pointing direction variable determined based upon the three dimension coordinate position of the player object at a location close to the player object on the game scene.

15. A method of operating a game in which a player object is displayed on a display unit comprising:

receiving a direction instruction for movement of the player object so that when the player object is placed within a virtual three dimensional space, the player object is displayed as viewed from a certain point of sight and supplied to said display unit, generating image data to display the player object and a direction pointing mark;

generating player object coordinate data representative of a current position of the player object in said virtual three dimensional space based upon an operating state of said direction instructions;

generating data of a pointed-subject to be pointed by the direction pointing mark;

determining a pointing direction of the direction pointing mark in said virtual three dimensional space based on the pointed-subject data and the player object coordinate data;

generating direction pointing mark data and displaying the direction pointing mark at a location close to the player object and in a determined direction; and generating display data according to the image data, the player object coordinate data and the direction pointing mark data, in order to combine the player object with the direction pointing mark to display a two-dimensional combined image on said display unit.

16. A method of operating a game according to claim 15, further comprising:

generating target coordinate data representative of a coordinate position of a target existing in a direction that the player object is to advance, determining a direction of the direction pointing mark based on the target coordinate data and the player object coordinate data such that the direction pointing mark points to a direction in which the target is viewed from the player object, and generating data for a target pointing mark to point to a direction of the target.

17. A method of operating a game according to claim 16, further comprising:

determining a straight line connecting between the player object and the target based on the target coordinate data and the player object coordinate data, and determining the pointing direction such that the pointing direction of the target pointing mark is along the straight line.

18. A method of operating a game according to claim 15, further comprising:

determining a direction of the direction pointing mark such that the direction pointing mark indicates a direction in which the player object is to move to a particular azimuth point in said virtual three dimensional space based on the player object coordinate data, and generating data for an azimuth pointing mark to point the particular azimuth point as viewed from the player object.

19. A method of operating a game according to claim 18, further comprising: determining a straight line connecting between the player object and the particular azimuth point based on the particular azimuth point coordinate data and the player object coordinate data, and determining the pointing direction such that the pointing direction of the azimuth pointing mark is along the straight line.

20. A method of operating a game according to claim 15, further comprising:

generating target coordinate data representative of a coordinate point of a target existing in a direction that the player object is to advance, determining a direction of the direction pointing mark such that the direction pointing mark indicates a direction in which the target is viewed from the player object based on the target coordinate data and the player object coordinate data, and determining a direction of the direction pointing mark such that the direction pointing mark indicates a direction in which the player object is to move to a particular azimuth point in said virtual three dimensional space based on the player object coordinate data, and generating data for a target pointing mark to indicate a direction of the target and data for an azimuth pointing mark to indicate the particular azimuth point as viewed from the player object.

21. A method of operating a game according to claim 20, further comprising: generating a direction pointing mark data to display the target pointing mark and the azimuth pointing mark in a display form different from each other.

22. A method of operating a game according to claim 15, further comprising:

generating marker data representative of a marker set on a path that the player object has passed, determining a direction of the direction pointing mark such that the direction pointing mark indicates a direction in which the player object is to move toward the marker in said virtual three dimensional space based on the player object coordinate data and coordinate data for the marker, and generating data of a marker direction pointing mark to indicate the marker as viewed from the player object.

23. A method of operating a game according to claim 22, further comprising: determining a straight line connecting between the player object and the marker based on coordinate data of the marker and the player object coordinate data, and determining the pointing direction such that the pointing direction of the marker direction pointing mark is along the straight line.

24. A method of operating a game according to claim 15, further comprising: generating image data to display a direction pointing mark in such a shape that is thinned in a direction from the player object to a pointed-subject.

* * * * *